(12) United States Patent
Taherzadeh Boroujeni et al.

(10) Patent No.: US 12,207,271 B2
(45) Date of Patent: Jan. 21, 2025

(54) TECHNIQUES FOR INDICATING PHYSICAL UPLINK CONTROL CHANNEL REPETITION FOR RANDOM ACCESS PROCEDURES

(71) Applicant: QUALCOMM Incorporated, San Diego, CA (US)

(72) Inventors: Mahmoud Taherzadeh Boroujeni, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/584,805

(22) Filed: Jan. 26, 2022

(65) Prior Publication Data

US 2022/0322417 A1 Oct. 6, 2022

Related U.S. Application Data

(60) Provisional application No. 63/170,966, filed on Apr. 5, 2021.

(51) Int. Cl.
*H04W 4/00* (2018.01)
*H04W 72/1273* (2023.01)
*H04W 72/23* (2023.01)
*H04W 74/0833* (2024.01)

(52) U.S. Cl.
CPC ....... *H04W 72/23* (2023.01); *H04W 72/1273* (2013.01); *H04W 74/0833* (2013.01)

(58) Field of Classification Search
CPC ............ H04W 72/23; H04W 72/1273; H04W 47/0833
See application file for complete search history.

(56) References Cited

U.S. PATENT DOCUMENTS

| | | | | |
|---|---|---|---|---|
| 10,863,364 | B2* | 12/2020 | Veeramallu | H04W 76/18 |
| 11,595,997 | B2* | 2/2023 | Moroga | H04L 1/189 |
| 2019/0261407 | A1* | 8/2019 | Irukulapati | H04W 74/008 |
| 2021/0051707 | A1* | 2/2021 | Rastegardoost | H04W 74/006 |
| 2021/0153232 | A1* | 5/2021 | Yu | H04W 72/0453 |
| 2021/0298054 | A1* | 9/2021 | Wong | H04L 5/0091 |
| 2022/0201772 | A1* | 6/2022 | Shin | H04W 74/0841 |
| 2022/0232636 | A1* | 7/2022 | Shin | H04W 72/23 |
| 2022/0232639 | A1* | 7/2022 | Wang | H04L 1/1896 |
| 2023/0075364 | A1* | 3/2023 | Zhou | H04L 5/0055 |

* cited by examiner

*Primary Examiner* — Abdelnabi O Musa
(74) *Attorney, Agent, or Firm* — Dalei Dong; Holland & Hart LLP

(57) ABSTRACT

Methods, systems, and devices for wireless communication are described. A communication device, such as a user equipment (UE) may receive, from a network entity, a random access message of a random access procedure, which may be a two-step random access channel (RACH) procedure or a four-step RACH procedure. In some examples, the UE may receive the PUCCH repetition parameter via a physical downlink control channel (PDCCH). Alternatively, the UE may receive the PUCCH repetition parameter via a physical downlink shared channel (PDSCH). The UE may determine a physical uplink control channel (PUCCH) repetition parameter based on the received random access message, and may transmit, to the network entity, feedback information on a PUCCH based on the determined PUCCH repetition parameter.

27 Claims, 18 Drawing Sheets

TECHNIQUES FOR INDICATING PHYSICAL UPLINK CONTROL CHANNEL REPETITION FOR RANDOM ACCESS PROCEDURES

CROSS REFERENCE

The present application for patent claims the benefit of U.S. Provisional Patent Application No. 63/170,966 by TAHERZADEH BOROUJENI et al., entitled "TECHNIQUES FOR INDICATING PHYSICAL UPLINK CONTROL CHANNEL REPETITION FOR RANDOM ACCESS PROCEDURES," filed Apr. 5, 2021, assigned to the assignee hereof, and hereby incorporated by reference in its entirety.

FIELD OF DISCLOSURE

The following relates to wireless communication, including techniques for indicating physical uplink control channel (PUCCH) repetition for random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a UE may perform a random access channel (RACH) procedure (also referred to as a random access procedure) with a base station prior to establishing a radio resource control (RRC) connection with the base station. As a part of the RACH procedure, the base station and the UE may exchange one or more RACH messages (also referred to as random access messages). In some cases, the UE may transmit feedback information for the one or more RACH messages. However, in some cases, the base station may be unable to receive and decode the feedback information from the UE.

SUMMARY

Various aspects of the present disclosure relate to techniques for indicating physical uplink control channel (PUCCH) repetition for random access procedures. A user equipment (UE) may perform a random access channel (RACH) procedure with a base station prior to establishing a radio resource control (RRC) connection with the base station. The RACH procedure may be a four-step RACH procedure or a two-step RACH procedure. During the RACH procedure, the base station may transmit a random access message to the UE on a physical downlink control channel (PDCCH) or a physical downlink shared channel (PDSCH). The random access message may be a message 4 (msg4) of a four-step RACH procedure or a message B (msgB) of a two-step RACH procedure.

The UE may determine a PUCCH repetition parameter based on the random access message. For example, the UE may determine the PUCCH repetition parameter based on a bitfield, a PDCCH aggregation level, a control channel element (CCE), or a combination thereof associated with the random access message. Alternatively, the base station may configure the UE with a set of PUCCH repetition parameters via system information (e.g., remaining minimum system information (RMSI)) and may indicate a PUCCH repetition parameter from the set via a downlink control information (DCI) message during the RACH procedure. Additionally or alternatively, the PUCCH repetition parameter may be based on a frequency range of the UE, a subcarrier spacing (SCS) of the UE, a capability of the UE, or a combination thereof. The PUCCH repetition parameter may also correspond to a PUCCH format.

The UE may transmit feedback information (e.g., a hybrid automatic repeat request (HARD)-acknowledgement (ACK)) associated with the random access message (e.g., a msg4 of a four-step RACH procedure or a msgB of a two-step RACH procedure) to the base station on a PUCCH based on the determined PUCCH repetition parameter. For example, the UE may transmit multiple repetitions (e.g., PUCCH repetitions) of the feedback information to the base station based on the determined PUCCH repetition parameter. By transmitting the feedback information based on the determined PUCCH repetition parameter, the UE may increase the likelihood of the base station successfully receiving the feedback information from the UE. The present disclosure may promote higher reliability and lower latency random access procedures, among other benefits by improving the reliability of feedback transmission using PUCCH repetitions.

A method for wireless communication at a UE is described. The method may include receiving, from a network entity, a random access message of a random access procedure, determining a PUCCH repetition parameter based on the received random access message, and transmitting, to the network entity, feedback information on a PUCCH based on the determined PUCCH repetition parameter.

An apparatus for wireless communication at a UE is described. The apparatus may include a processor, memory coupled with the processor, and instructions stored in the memory. The instructions may be executable by the processor to cause the apparatus to receive, from a network entity, a random access message of a random access procedure, determine a PUCCH repetition parameter based on the received random access message, and transmit, to the network entity, feedback information on a PUCCH based on the determined PUCCH repetition parameter.

Another apparatus for wireless communication at a UE is described. The apparatus may include means for receiving, from a network entity, a random access message of a random access procedure, means for determining a PUCCH repetition parameter based on the received random access message, and means for transmitting, to the network entity, feedback information on a PUCCH based on the determined PUCCH repetition parameter.

A non-transitory computer-readable medium storing code for wireless communication at a UE is described. The code may include instructions executable by a processor to receive, from a network entity, a random access message of a random access procedure, determine a PUCCH repetition parameter based on the received random access message, and transmit, to the network entity, feedback information on a PUCCH based on the determined PUCCH repetition parameter.

In some examples of the method, apparatuses, and non-transitory computer-readable medium described herein, the random access message includes an indication of the PUCCH repetition parameter.

Some examples of the method, apparatuses, and non-transitory computer-readable medium described herein may further include operations, features, means, or instructions for receiving the random access message including the indication of the PUCCH repetition parameter on a PDSCH.

In some examples of the method, apparatuses, and non-transitory computer-readable medium described herein, the random access procedure includes a two-step random access procedure and the random access message includes a message B associated with the two-step random access procedure.

In some examples of the method, apparatuses, and non-transitory computer-readable medium described herein, the random access procedure includes a four-step random access procedure and the random access message includes a msg4 associated with the four-step random access procedure.

Some examples of the method, apparatuses, and non-transitory computer-readable medium described herein may further include operations, features, means, or instructions for receiving the random access message including the indication of the PUCCH repetition parameter on a PDCCH.

In some examples of the method, apparatuses, and non-transitory computer-readable medium described herein, the random access procedure includes a two-step random access procedure and the random access message includes a message B associated with the two-step random access procedure.

In some examples of the method, apparatuses, and non-transitory computer-readable medium described herein, the random access procedure includes a four-step random access procedure and the random access message includes a msg4 associated with the four-step random access procedure.

Some examples of the method, apparatuses, and non-transitory computer-readable medium described herein may further include operations, features, means, or instructions for receiving DCI on the PDCCH during the random access procedure, the DCI including a DCI bitfield indicating the PUCCH repetition parameter.

Some examples of the method, apparatuses, and non-transitory computer-readable medium described herein may further include operations, features, means, or instructions for determining the PUCCH repetition parameter based on one or more of an aggregation level associated with the PDCCH or a CCE location associated with the PDCCH.

Some examples of the method, apparatuses, and non-transitory computer-readable medium described herein may further include operations, features, means, or instructions for determining the PUCCH repetition parameter based on a PUCCH resource indicator bitfield.

Some examples of the method, apparatuses, and non-transitory computer-readable medium described herein may further include operations, features, means, or instructions for receiving, from the network entity, a system information block (SIB) including system information indicating a PUCCH repetition configuration including a set of PUCCH repetition parameters.

Some examples of the method, apparatuses, and non-transitory computer-readable medium described herein may further include operations, features, means, or instructions for selecting the PUCCH repetition parameter from the set of PUCCH repetition parameters based on the received random access message, where the system information includes RMSI.

In some examples of the method, apparatuses, and non-transitory computer-readable medium described herein, the PUCCH repetition parameter corresponds to a PUCCH format.

In some examples of the method, apparatuses, and non-transitory computer-readable medium described herein, the PUCCH repetition parameter corresponds to one or more of a frequency range or a subcarrier spacing.

In some examples of the method, apparatuses, and non-transitory computer-readable medium described herein, the random access procedure includes a two-step random access procedure or a four-step random access procedure.

In some examples of the method, apparatuses, and non-transitory computer-readable medium described herein, the feedback information includes a HARQ-ACK.

A method for wireless communication at a network entity is described. The method may include transmitting, to a UE, a random access message of a random access procedure and receiving, from the UE, feedback information via a PUCCH based on a PUCCH repetition parameter.

An apparatus for wireless communication at a network entity is described. The apparatus may include a processor, memory coupled with the processor, and instructions stored in the memory. The instructions may be executable by the processor to cause the apparatus to transmit, to a UE, a random access message of a random access procedure and receive, from the UE, feedback information via a PUCCH based on a PUCCH repetition parameter.

Another apparatus for wireless communication at a network entity is described. The apparatus may include means for transmitting, to a UE, a random access message of a random access procedure and means for receiving, from the UE, feedback information via a PUCCH based on a PUCCH repetition parameter.

A non-transitory computer-readable medium storing code for wireless communication at a network entity is described. The code may include instructions executable by a processor to transmit, to a UE, a random access message of a random access procedure and receive, from the UE, feedback information via a PUCCH based on a PUCCH repetition parameter.

In some examples of the method, apparatuses, and non-transitory computer-readable medium described herein, the random access message includes an indication of the PUCCH repetition parameter.

Some examples of the method, apparatuses, and non-transitory computer-readable medium described herein may further include operations, features, means, or instructions for transmitting the random access message including the indication of the PUCCH repetition parameter on a PDSCH.

In some examples of the method, apparatuses, and non-transitory computer-readable medium described herein, the random access procedure includes a two-step random access procedure and the random access message includes a message B associated with the two-step random access procedure.

In some examples of the method, apparatuses, and non-transitory computer-readable medium described herein, the random access procedure includes a four-step random access procedure and the random access message includes a msg4 associated with the four-step random access procedure.

Some examples of the method, apparatuses, and non-transitory computer-readable medium described herein may further include operations, features, means, or instructions for transmitting the random access message including the indication of the PUCCH repetition parameter on a PDCCH.

In some examples of the method, apparatuses, and non-transitory computer-readable medium described herein, the random access procedure includes a two-step random access procedure and the random access message includes a message B associated with the two-step random access procedure.

In some examples of the method, apparatuses, and non-transitory computer-readable medium described herein, the random access procedure includes a four-step random access procedure and the random access message includes a msg4 associated with the four-step random access procedure.

Some examples of the method, apparatuses, and non-transitory computer-readable medium described herein may further include operations, features, means, or instructions for transmitting DCI on the PDCCH during the random access procedure, the DCI including a DCI bitfield indicating the PUCCH repetition parameter.

Some examples of the method, apparatuses, and non-transitory computer-readable medium described herein may further include operations, features, means, or instructions for transmitting, to the UE, a SIB including system information indicating a PUCCH repetition configuration including a set of PUCCH repetition parameters including the PUCCH repetition parameter, where the system information includes RMSI.

In some examples of the method, apparatuses, and non-transitory computer-readable medium described herein, the PUCCH repetition parameter corresponds to a PUCCH format.

In some examples of the method, apparatuses, and non-transitory computer-readable medium described herein, the PUCCH repetition parameter corresponds to one or more of a frequency range or a SCS.

In some examples of the method, apparatuses, and non-transitory computer-readable medium described herein, the random access procedure includes a two-step random access procedure or a four-step random access procedure.

In some examples of the method, apparatuses, and non-transitory computer-readable medium described herein, the feedback information includes a HARQ-ACK.

DETAILED DESCRIPTION

Figure 1:
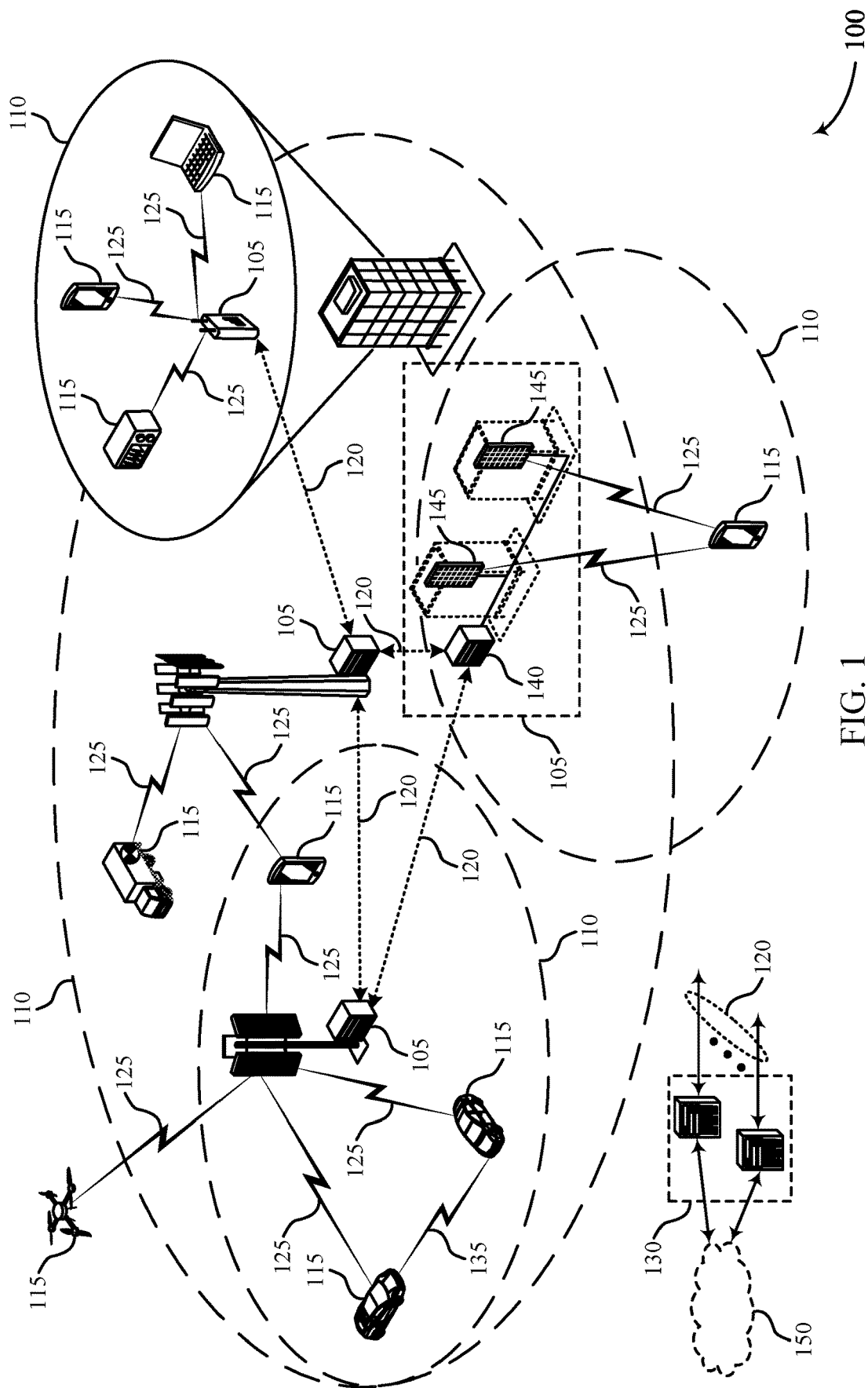
FIG. 1 illustrates an example of a wireless communications system that supports techniques for indicating physical uplink control channel (PUCCH) repetition for random access procedures in accordance with various aspects of the present disclosure.

Some wireless communications systems include communication devices, such as a user equipment (UE) and a base station (for example, an eNodeB (eNB), a next-generation NodeB or a giga-NodeB, any of which may be referred to as a gNB, or some other base station), that may support multiple radio access technologies (RATs). Examples of RATs include fourth generation (4G) systems, such as Long-Term Evolution (LTE) systems, and fifth generation (5G)

systems, which may be referred to as new radio (NR) systems. A UE and a base station or other communication devices (e.g., other access nodes, base stations) may establish a connection or re-establish a connection using a random access channel (RACH) procedure, which may also be referred to as a random access procedure. The RACH procedure may include a series of handshake messages carrying information that facilitates establishing the connection between the UE and the base station.

The RACH procedure may be a two-step RACH procedure or a four-step RACH procedure. As part of the four-step RACH procedure, the base station and the UE may exchange one or more handshake messages (random access messages), such as a first random access message (also referred to herein as msg1), a second random access message (also referred to herein as msg2), a third random access message (also referred to herein as msg3), and a fourth random access message (also referred to herein as msg4). Alternatively, as part of the two-step RACH procedure, the base station and the UE may exchange one or more handshake messages (random access messages), such as first random access message (also referred to herein as msgA) and a second random access message (also referred to herein as msgB). One or more contents of the random access messages of the four-step RACH procedure may be combined in one or more of the random access messages of the two-step RACH procedure.

The UE may be configured to support beamformed communications via directional beams. For example, the UE may be configured with multiple antenna panels to support the beamformed communications. Due to the nature of beamformed communications, there may be instances when the base station is unable to successfully decode a random access message, such as a feedback message that the UE transmits in response to the msg4 or the msgB. To decrease or mitigate occasions that the base station is unable to successfully decode a random access message, the base station may configure the UE to transmit multiple repetitions (e.g., physical uplink control channel (PUCCH) repetitions) of the feedback message, such that the base station may receive the feedback message with improved reliability during a RACH procedure.

For a four-step RACH procedure, the base station may configure the UE with a PUCCH repetition parameter via the msg4. Similarly, for the two step RACH procedure, the base station may configure the UE with a PUCCH repetition parameter via the msgB. In some aspects, the base station may configure the UE with multiple PUCCH repetition parameters via system information (e.g., via remaining minimum system information (RMSI)) and may indicate one of the configured repetition parameters in either the msg4 or the msgB. Additionally or alternatively, the base station may configure the UE with the PUCCH repetition parameter based on capabilities of the UE, a subcarrier spacing (SCS) of the UE, an operating frequency range of the UE, or a combination thereof.

The subject matter described in the present disclosure can be implemented to realize one or more of the following advantages. The techniques employed by the communication devices (e.g., a base station or a UE) may provide benefits and enhancements to the operation of the communication devices, such as improved RACH procedures. For example, a UE may transmit feedback information (e.g., hybrid automatic repeat request (HARQ)-acknowledgement (ACK) feedback) to a base station on PUCCH resources (e.g., as part of a RACH procedure) with greater reliability by transmitting multiple repetitions of the feedback information, thereby increasing the likelihood of the base station successfully receiving at least one of the multiple repetitions.

Aspects of the disclosure are initially described in the context of wireless communications systems. Aspects of the disclosure are illustrated by and described with reference to process flows. Aspects of the disclosure are further illustrated by and described with reference to apparatus diagrams, system diagrams, and flowcharts that relate to techniques for indicating PUCCH repetition for random access procedures.

FIG. 1 illustrates an example of a wireless communications system 100 that supports techniques for indicating PUCCH repetition for random access procedures in accordance with various aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a network entity, a network node, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a bandwidth of the radio frequency spectrum band, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the SCS or radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to one or more UEs 115 and UE-specific search space sets for sending control information to a UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each of the access network transmission entities 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA) or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a slot for data received in a previous symbol in the slot. In other cases, the device may provide HARQ feedback in a subsequent slot, or according to some other time interval.

In the wireless communications system 100, a UE 115 may perform a RACH procedure with a base station 105 prior to establishing an RRC connection with the base station 105. In some examples, the RACH procedure may be a four-step RACH procedure or a two-step RACH procedure. During the RACH procedure, the base station 105 may transmit a random access message to the UE 115 on a physical downlink control channel (PDCCH) or a physical downlink shared channel (PDSCH). As an example, the random access message may be a msg4 of a four-step RACH procedure or a msgB of a two-step RACH procedure.

In some examples, the UE 115 may determine a PUCCH repetition parameter based on the random access message. For example, the UE 115 may determine the PUCCH repetition parameter based on a bitfield, a PDCCH aggregation level, a CCE location, or a combination thereof associated with the random access message. Alternatively, the base station 105 may configure the UE 115 with a set of PUCCH repetition parameters via system information (e.g., RMSI) and may indicate a PUCCH repetition parameter from the set via a downlink control information (DCI) message during the RACH procedure.

The PUCCH repetition parameter may be based on a frequency range of the UE 115 (e.g., an operating frequency range, such as frequency range 2 (FR2), among other frequency ranges), an SCS of the UE 115, a capability of the UE 115, or a combination thereof. In some examples, the PUCCH repetition parameter may correspond to a PUCCH format, such as first PUCCH format (e.g., PUCCH format 0) or a second PUCCH format (e.g., PUCCH format 1), or both. In some cases, the PUCCH repetition parameter may be applicable to a PUCCH format, but not another PUCCH format. For example, the UE 115 may support PUCCH repetition for the PUCCH format 0, but not for the PUCCH format 1. Alternatively, the UE 115 may support PUCCH repetition for the PUCCH format 1, but not for the PUCCH format 0.

The UE 115 may transmit feedback information (e.g., HARQ-ACK feedback) associated with the random access message to the base station 105 on a PUCCH based on the determined PUCCH repetition parameter. For example, the UE 115 may transmit multiple repetitions (e.g., PUCCH repetitions) of the feedback information to the base station 105 based on the determined PUCCH repetition parameter. By transmitting the feedback information based on the determined PUCCH repetition parameter, the UE 115 may increase the likelihood of the base station 105 successfully receiving the feedback information from the UE 115. As a result, the base station 105 and the UE 115 may communicate with increased reliability in the wireless communications system 100.

Figure 2:
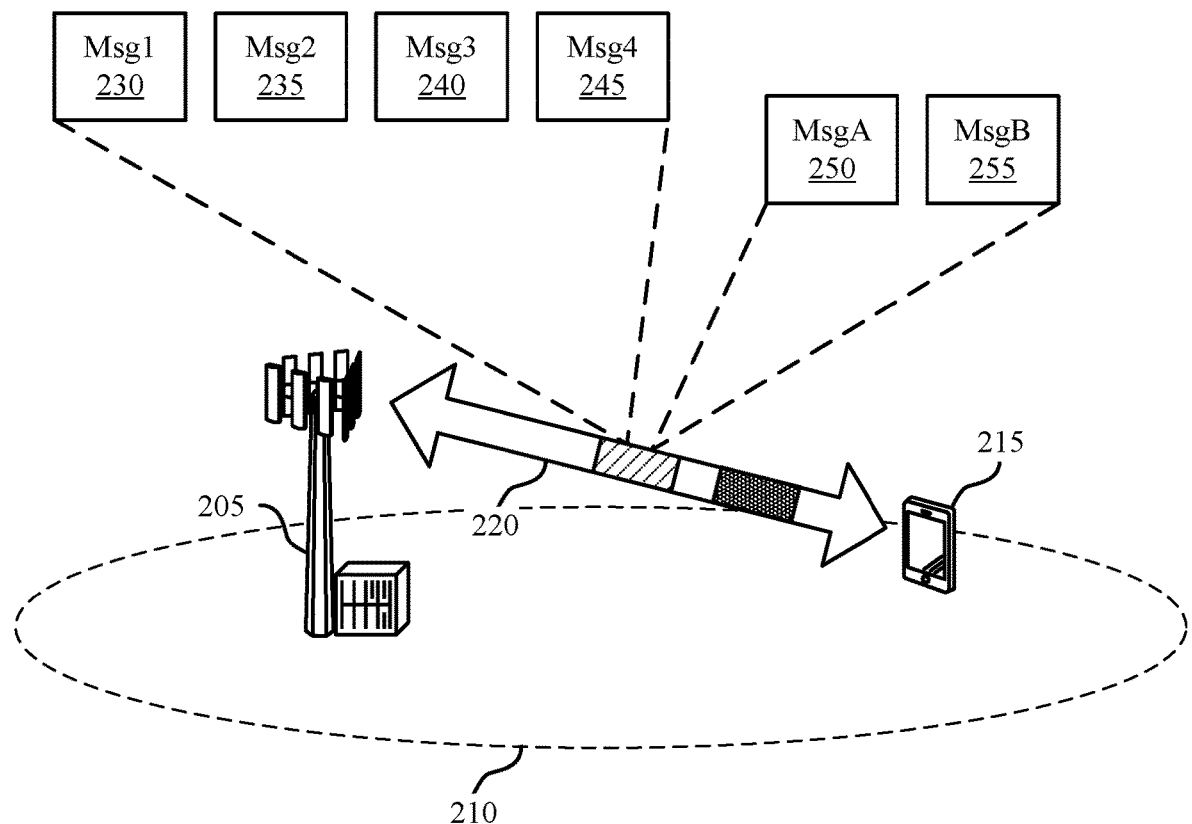
FIG. 2 illustrates an example of a wireless communications system that supports techniques for indicating PUCCH repetition for random access procedures in accordance with various aspects of the present disclosure.

FIG. 2 illustrates an example of a wireless communications system 200 that supports techniques for indicating PUCCH repetition for random access procedures in accordance with various aspects of the present disclosure. The wireless communications system 200 may implement aspects of the wireless communications system 100 or may be implemented by aspects of the wireless communications system 100. The wireless communications system 200 may include a base station 205 and a UE 215, which may be examples of a base station 105 and a UE 115 as described with reference to FIG. 1. The base station 205 and the UE 215 may communicate in a geographic coverage area 210 over a communication link 220, which may be examples of a geographic coverage area 110 and a communication link 125 as described with reference to FIG. 1. The wireless communications system 200 may support improved RACH procedures between the base station 205 and the UE 215. For example, the wireless communications system 200 may enable the UE 215 to transmit RACH feedback information (e.g., a feedback message 260) to the base station 205 with improved reliability based on transmitting multiple repetitions of the RACH feedback information.

The base station 205 and the UE 215 may perform a RACH procedure prior to establishing an RRC connection. The RACH procedure may be a two-step or a four-step RACH procedure. These RACH procedures may be contention-based or contention-free. As part of the RACH procedure, the base station 205 and the UE 215 may exchange one or more random access messages 225 (e.g., handshake messages). In a four-step RACH procedure, the random access messages 225 may include a msg1 230, a msg2 235, a msg3 240, and a msg4 245. The msg1 230 may include a RACH preamble or a sequence that may carry information, such as a UE identifier. The purpose of the preamble may be to provide an indication to the base station 205 of the presence of a random access attempt (e.g., from the UE 215). The preamble may also allow the base station 205 to determine a delay (e.g., a timing delay) between the base station 205 and the UE 215. The UE 215 may transmit the msg1 230 to the base station 205 on a physical random access channel (PRACH), for example.

The preamble of the msg1 230 may, in some examples, be defined by a preamble sequence and a cyclic prefix. Additionally or alternatively, the UE 215 may use a guard period to handle timing uncertainty of the msg1 230. For example, before beginning the RACH procedure, the UE 215 may obtain downlink synchronization with the base station 205 based in part on a cell-search procedure. However, because the UE 215 has not yet obtained uplink synchronization with the base station 205, there may be uncertainty in uplink timing due to a location of the UE 215 in a cell (e.g., the geographic coverage area 210 of the base station 205) being unknown. In some examples, the uncertainty in uplink timing may be based in part on a dimension (e.g., size, area) of the cell. Therefore, including a cyclic prefix to the msg1 230 may be beneficial, in some examples, for handling the uncertainty in uplink timing.

In some cases, there may be a number of preamble sequences (e.g., 64 preamble sequences) per cell. The UE 215 may select a preamble sequence from a set of sequences in a cell based on a randomness selection. In some examples, the UE 215 may select a preamble sequence based in part on an amount of traffic that the UE 215 has for transmission on a physical uplink shared channel (PUSCH). Based on the preamble sequence that the UE 215 selected, the base station 205 may determine uplink resources to grant to the UE 215.

Some examples of a RACH procedure may be contention-based or contention-free. When performing a contention-based RACH procedure, the UE 215 may select a preamble sequence from a set of sequences. That is, as long as other UEs (not shown) are not performing a random access attempt using the same sequence at a same temporal instance, no collisions will occur, and the random access attempt may be detected by the base station 205. If the UE 215 is performing a contention-free random access attempt (e.g., for a handover to a new cell), the preamble sequence to use may be explicitly signaled (e.g., in control information) by the base station 205. To avoid collisions or interference, the base station 205 may select a contention-free preamble sequence from sequences not associated with the contention-based random access attempt.

Upon receiving the msg1 230, the base station 205 may respond appropriately with the msg2 235. For example, the base station 205 may transmit the msg2 235 to the UE 215 on a PDSCH or a PDCCH. In some cases, the msg2 235 may have a same or a different configuration (format) compared to the msg1 230. The msg2 235 may carry information for the UE 215, where the information is determined by the base station 205 and is based on information carried in the msg1 230. For example, the information in the msg2 235 may include an index of a preamble sequence detected and for which the response is valid, a timing advance determined based on the preamble sequence detected, a scheduling grant indicating time and frequency resources for the UE 215 to use for transmission of a next random access message transmission by the UE 215, or a network identifier for further communication with the UE 215.

In some examples, upon reception of the timing advance in the msg2 235, the UE 215 may activate an uplink alignment timer. The UE 215 may extend a value of the uplink alignment timer to account for a propagation delay period between the base station 205 and the UE 215. A contention resolution may be considered successful for a system information request, after receiving a contention resolution identifier MAC-CE. The UE 215 may deactivate the uplink alignment timer without waiting to transmit HARQ-ACK feedback (e.g., a feedback message 260), if configured. Once the UE 215 successfully receives the msg2 235, the UE 215 may obtain uplink synchronization with the base station 205. In some examples, before data transmission from the UE 215, a unique identifier within the cell may be assigned to the UE 215. In some examples, depending on an RRC state (e.g., an RRC connected state, an RRC ideal state) of the UE 215, there may be an additional message (e.g., a connection request message) exchange for setting up the connection between the base station 205 and the UE 215. The UE 215 may transmit the msg3 240 to the base station 205 using PUSCH resources assigned in the msg2 235. The msg3 240 may include a UE identifier for contention resolution.

The base station 205 may receive the msg3 240 and may respond accordingly, for example, by transmitting the msg4 245, which may be a contention resolution message. When multiple UEs are performing simultaneous random access attempts using a same preamble sequence, these UEs may listen for a response message (e.g., the msg4 240). Each of the UEs may receive the msg4 245 and compare an identifier (e.g., a network identifier) in the msg4 245 to the identifier specified in the msg3 240. When the identifiers match, the corresponding UE (e.g., the UE 215) may declare the RACH procedure successful. As a result of the RACH procedure, the base station 205 and the UE 215 may establish a connection (e.g., via the communication link 220).

Alternatively, in a two-step RACH procedure, the random access messages 225 may include a msgA 250 and a msgB 255. The msgA 250 may include information corresponding to the msg1 230 and the msg3 240 of the 4-step RACH procedure. For example, the msgA 250 may include a RACH preamble and an uplink payload (e.g., uplink data). In some cases, the msgA 250 payload may have a configurable payload size (e.g., a few bytes up to a few hundred bytes). Additionally or alternatively, the msgA 250 may include a MAC-CE, an uplink control information (UCI) piggyback message (e.g., a UCI message transmitted with uplink data on a PUSCH), or a combination thereof. In some cases, the UE 215 may transmit the msgA 250 on a PUCCH, a PUSCH, or both. The msgB 255 may include information corresponding to the msg2 235 and the msg4 245 of the four-step RACH procedure.

For example, the msgB 255 may include a contention resolution message and a downlink payload (e.g., downlink data). The msgB 255 may be used for contention resolution and completion of the RACH procedure if transmission of the msgA 250 is successful. In some cases, the base station 205 may transmit the msgB 255 on a PDSCH, a PDCCH, or both. For example, the base station 205 may transmit a first portion of the msgB 255 on a PDCCH and a second portion of the msgB 255 on a PDSCH. In some cases, the first portion transmitted on the PDCCH may indicate PDSCH resources on which the base station is scheduled to transmit the second portion of the msgB 255. In some cases, the msgB 255 may include an indication of one or more demodulation reference signal (DMRS) resources that the UE 215 may use to perform channel estimation prior to receiving the msgB 255.

In some cases, the msgB 255 may include a request for retransmission of a msgA 250 payload (e.g., uplink data) on granted resources (e.g., PUSCH resources) if msgA 250 preamble detection is successful but msgA 250 payload decoding fails. That is, contents of the msgB 255 (e.g., on the PDSCH, the PDCCH, or both) may depend on the decoding outcome of the msgA 250. In comparison to a four-step RACH procedure, a two-step RACH procedure may be associated with reduced signaling overhead, decreased latency, increased RACH capacity, and greater power efficiency.

In response to either the msg4 245 (e.g., in a four-step RACH procedure) or the msgB 255 (e.g., in a two-step RACH procedure), the UE 215 may transmit a feedback message 260 to the base station 205. The feedback message 260 may include HARQ-ACK feedback for the msg4 245 or the msgB 255. In some cases, however, the base station 205 and the UE 215 may use relatively wider beams to perform the RACH procedure. As a result of using relatively wider beams, the base station 205 and the UE 215 may experience reduced coverage while exchanging the random access messages 225. Thus, the base station 205 may have a reduced likelihood of successfully receiving the feedback message 260 (along with other random access messages 225) from the UE 215, thereby reducing the reliability of communications between the UE 215 and the base station 205 during the RACH procedure.

In accordance with various aspects of the present disclosure, the wireless communications system 200 may enable the UE 215 to transmit the feedback message 260 for the msg4 245 (e.g., of a four-step RACH procedure) or the msgB 255 (e.g., of a two-step RACH procedure) to the base station 205 with increased reliability based on transmitting multiple repetitions of the feedback message 260 on PUCCH resources. The base station 205 may dynamically configure the UE 215 to transmit multiple repetitions of the feedback message 260 via a PUCCH repetition parameter. In some examples, the base station 205 may dynamically indicate the PUCCH repetition parameter to the UE 215 via the msg4 245 or via the msgB 255.

For example, if the UE 215 and the base station 205 are performing a four-step RACH procedure, the base station 205 may include an indication of the PUCCH repetition parameter in the msg4 245. In some examples, if the base station 205 transmits a first portion of the msg4 245 on a PDCCH and a second portion of the msg4 245 on a PDSCH, the PUCCH repetition parameter may be indicated in the first portion (e.g., on the PDCCH), the second portion (e.g., on the PDSCH), or both. Alternatively, if the base station 205 and the UE 215 are performing a two-step RACH procedure, the base station 205 may include an indication of the PUCCH repetition parameter in the msgB 255. For example, if the base station 205 transmits a first portion of the msgB 255 on a PDCCH and a second portion of the msgB 255 on a PDSCH, the base station 205 may indicate the PUCCH repetition parameter to the UE 215 on the PDCCH, the PDSCH, or both.

In some examples, the base station 205 may indicate the PUCCH repetition parameter to the UE 215 via a bitfield in a DCI message, for example, carried on the PDCCH of the msgB 255. In some other examples, the base station 205 may indicate the PUCCH repetition parameter to the UE 215 via a PUCCH resource indicator (PRI) bitfield corresponding to the msgB 255. In some other examples, the base station 205 may indicate the PUCCH repetition parameter to the UE 215 via RMSI (e.g., in a system information block (SIB)). In other examples, the UE 215 may determine the PUCCH repetition parameter based on a PDCCH aggregation level, one or more CCEs, or a combination thereof associated with either the msgB 255 or the msg4 245. In some examples, the PDCCH aggregation level associated with the UE 215 may refer to a number of CCEs on which the UE 215 is configured to receive PDCCH transmissions. For example, if the UE 215 is configured with a PDCCH aggregation level of 4, the UE 215 may receive PDCCH transmissions from the base station 205 on 4 different CCEs.

In some examples, the PUCCH repetition parameter may be based on a frequency range of the UE 215, an SCS of the UE 215, or a combination thereof. For example, the PUCCH repetition parameter may be applicable to the UE 215 if the UE 215 is operating in a radio frequency spectrum band (e.g., an FR2) or if the UE 215 is using an SCS above a threshold (e.g., 30 kHz). In some examples, the PUCCH repetition parameter may be applicable to a PUCCH formats. For example, the PUCCH repetition factor may be applicable to PUCCH format 0 but not applicable to PUCCH format 1.

By transmitting multiple repetitions of a feedback message 260 carrying HARQ-ACK feedback for either the msg4 245 or the msgB 255 in accordance with a PUCCH repetition parameter, the UE 215 may increase the likelihood of the base station 205 successfully receiving the feedback message 260. As a result, the base station 205 and the UE 215 may communicate with increased reliability in the wireless communications system 200.

Figure 3:
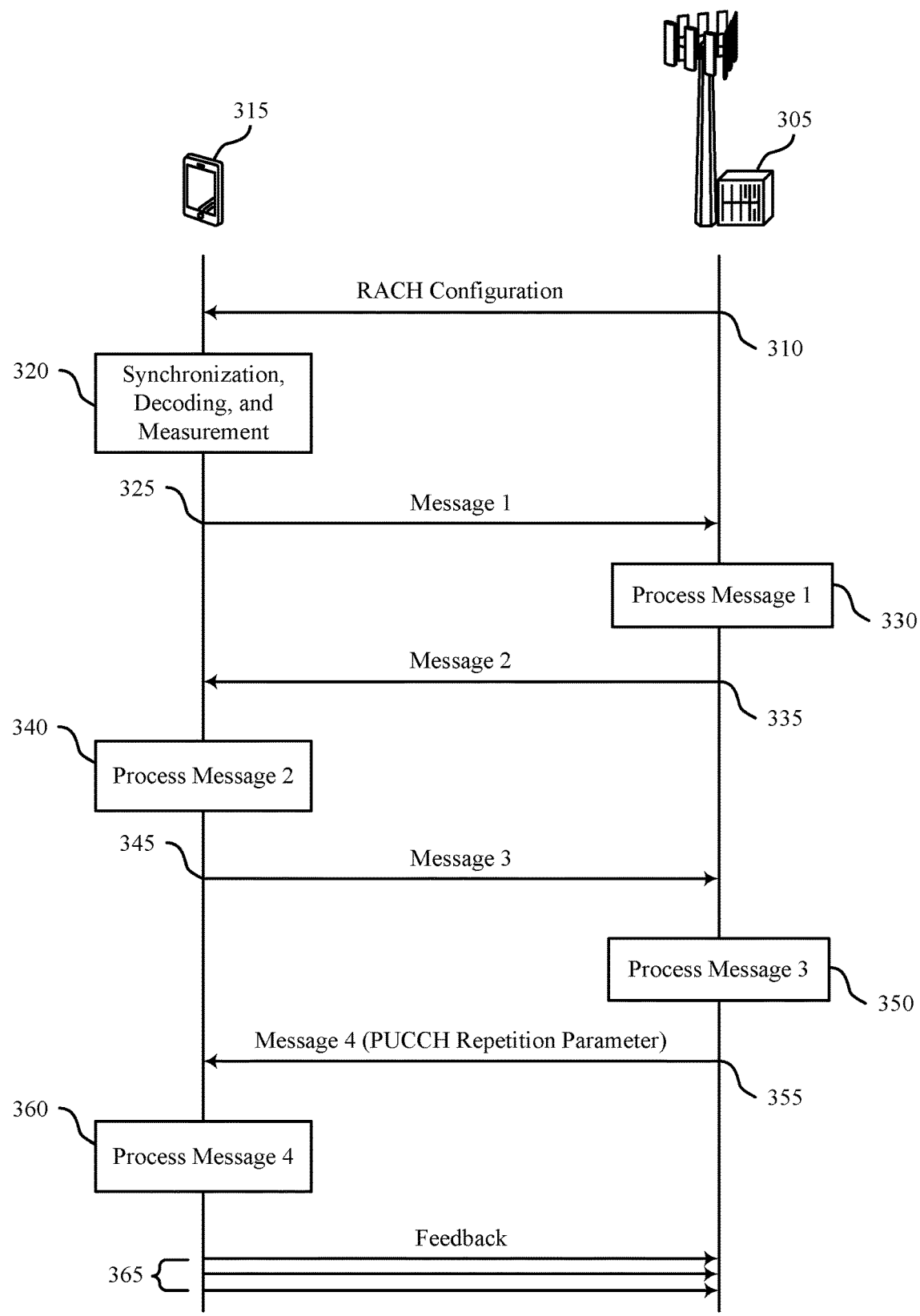
FIG. 3 illustrates an example of a process flow that supports techniques for indicating PUCCH repetition for random access procedures in accordance with various aspects of the present disclosure.

FIG. 3 illustrates an example of a process flow 300 that supports techniques for indicating PUCCH repetition for random access procedures in accordance with various aspects of the present disclosure. The process flow 300 may implement or be implemented by aspects of the wireless communications system 100 or the wireless communications system 200, as described with reference to FIGS. 1 and 2, respectively. For example, the process flow 300 may implement or be implemented by a base station 305 and a UE 315. In the following description of the process flow 300, the operations between the base station 305 and the UE 315 may be transmitted in a different order than the example order shown, or the operations performed by the base station 305 and the UE 315 may be performed in different orders or at different times. Some operations may also be omitted from the process flow 300, and other operations may be added to the process flow 300. In the example of FIG. 3, the UE 315 and the base station 305 may perform a four-step RACH procedure.

At 310, the base station 305 may transmit a RACH configuration to the UE 315. In some examples, the RACH configuration via a synchronization signal block (SSB), a SIB, one or more reference signals, or a combination thereof. At 320, the UE 315 may perform synchronization operations, decoding operations, measurement operations, or a combination thereof based on receiving the RACH configuration from the base station 305. For example, the UE 315 may perform a synchronization operation based on receiving the SSB from the base station 305. The UE 315 may also perform a decoding operation based on receiving the SIB from the base station 305. Additionally, the UE 315 may perform a measurement operation based on measuring the one or more reference signals transmitted by the base station 305. In some examples, the UE 315 may determine a PUCCH repetition parameter based on the RACH configuration from the base station 305. For example, the base station 305 may configure the UE 315 with a set of PUCCH repetition parameters via the RACH configuration.

At 325, the UE 315 may transmit a msg1 to the base station 305. The msg1 may include a random access preamble or a sequence that may carry information, such as an identifier of the UE 315. The preamble may also indicate, to the base station 305, a random access attempt of the UE 315. Additionally, the msg1 may enable the base station 305 a to determine a delay (e.g., a timing delay) between the base station 305 and the UE 315. The UE 315 may transmit the msg1 to the base station 305 a on a physical random access channel (PRACH). At 330, the base station 305 may process the msg1 from the UE 315. For example, the base station 305 may determine an identifier of the UE 315 based on processing the msg1. Additionally or alternatively, the base station 305 may determine a timing delay between the base station 305 and the UE 315 based on processing the msg1.

At 335, the base station 305 may transmit a msg2 to the UE 315. The msg2 may include a preamble response, timing alignment information, an initial uplink grant, an identifier for the UE 315, or a combination thereof. For example, the msg2 may include an index of a detected preamble sequence from the UE 315, a timing advance based on the detected preamble sequence, a scheduling grant indicating time and frequency resources for the UE 315 to use for transmission of another random access message (e.g., a msg3), or a network identifier corresponding to the UE 315. In some examples, the base station 305 may transmit the msg2 to the UE 315 on a PDSCH or a PDCCH. At 340, the UE 315 may process the msg2 from the base station 305. In some examples, the UE 315 may obtain uplink synchronization with the base station 305 based on processing the msg2 from the base station 305. Additionally or alternatively, the UE 315 may determine an identifier (e.g., a cell radio network temporary identifier (C-RNTI)) for the UE 315 based on processing the msg2 from the base station 305.

At 345, the UE 315 may transmit a msg3 to the base station 305. The msg3 may include an identifier (e.g., a C-RNTI) corresponding to the UE 315, which the base station 305 may use for contention resolution. Additionally or alternatively, the msg3 may include uplink data (e.g., a scheduled uplink transmission). In some examples, the UE 315 may transmit the msg3 over a PUSCH, a PUCCH, or both. At 350, the base station 305 may process the msg3 from the UE 315.

At 355, the base station 305 may transmit a msg4 to the UE 315. The msg4 may include a contention resolution message. The base station 305 may transmit the msg4 on a PDCCH, a PDSCH, or both. The msg4 may indicate a PUCCH repetition parameter, which the UE 315 may use to transmit a feedback message (e.g., HARQ-ACK feedback) associated with the msg4. In some examples, the base station 305 may transmit the PUCCH repetition parameter on a PDCCH, a PDSCH, or both. At 360, the UE 315 may process the msg4 from the base station 305. For example, the UE 315 may determine a PUCCH repetition parameter based on processing the msg4.

At 365, the UE 315 may transmit feedback associated with the msg4 to the base station 305. The UE 315 may transmit the feedback based on a PUCCH repetition parameter. That is, the UE 315 may transmit multiple repetitions (e.g., PUCCH repetitions) of the feedback message based on the determined PUCCH repetition parameter. In some examples, the UE 315 may determine the PUCCH repetition parameter based on receiving the msg4 from the base station 305. For example, the msg4 may include an indication of the PUCCH repetition parameter. If the base station 305 transmits a first portion of the msg4 (e.g., control information) on a PDCCH and a second portion of the msg4 (e.g., downlink data) on a PDSCH, the base station 305 may include an indication of the PUCCH repetition parameter in the first portion, the second portion or both.

In some other examples, the base station 305 may indicate the PUCCH repetition parameter to the UE 315 in a bitfield of a DCI message. For example, the base station 305 may transmit a DCI message to the UE 315 (e.g., on a PDCCH) during the four-step RACH procedure and may include an indication of the PUCCH repetition in the DCI message. Alternatively, the base station 305 may indicate the PUCCH repetition parameter to the UE 315 implicitly via a PDCCH aggregation level, a CCE location, or a PRI bitfield corresponding to the msgB. In some examples, the PUCCH repetition parameter may be based on a frequency range, an SCS, UE capabilities, or a combination thereof associated with the UE 315. Additionally or alternatively, the PUCCH repetition parameter may correspond to a specific PUCCH format.

By transmitting multiple repetitions of HARQ-ACK feedback for the msg4 in accordance with a PUCCH repetition parameter, the UE 315 may increase the likelihood of the base station 305 successfully receiving the HARQ-ACK feedback. As a result, the base station 305 and the UE 315 may communicate with increased reliability.

Figure 4:
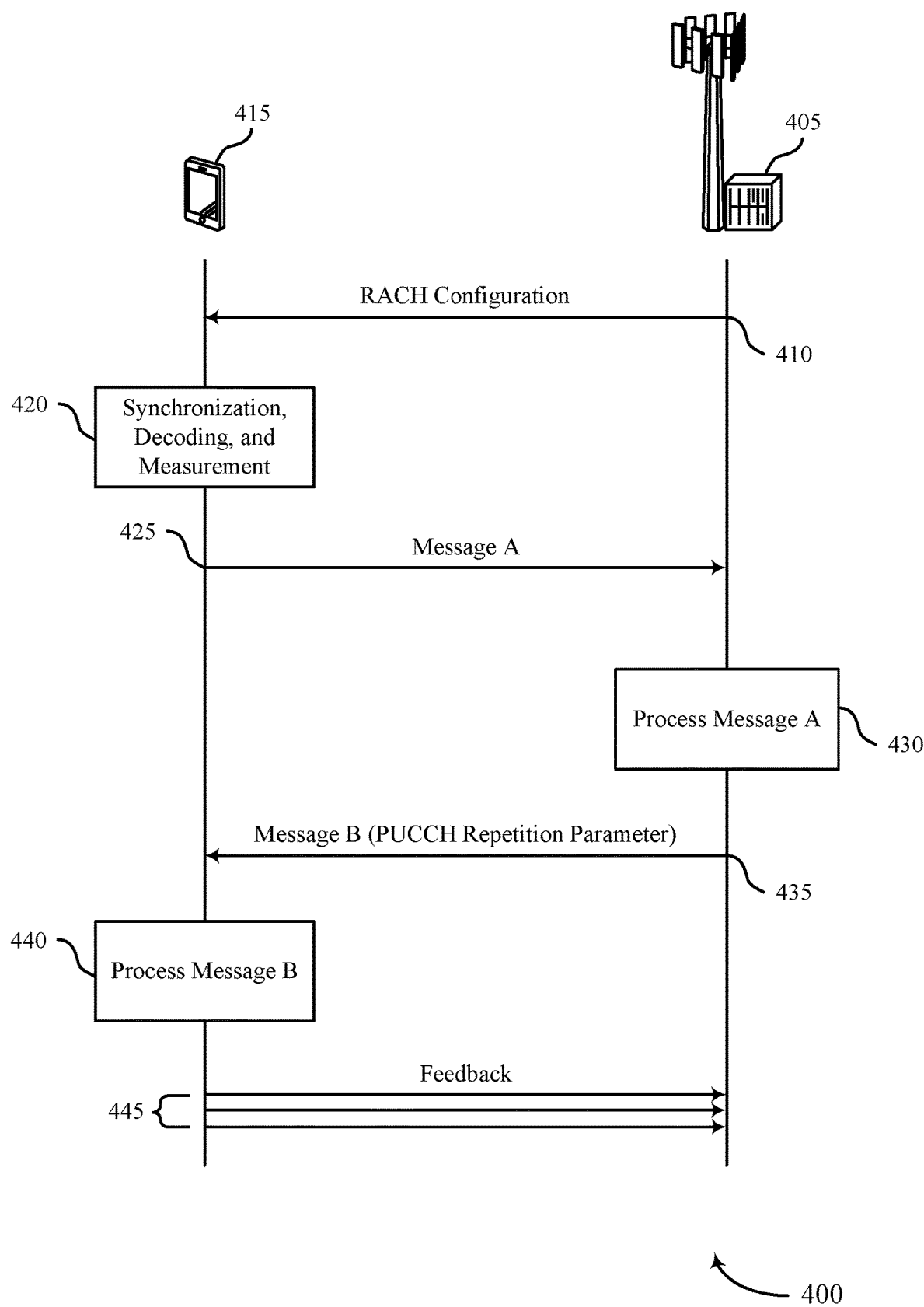
FIG. 4 illustrates an example of a process flow that supports techniques for indicating PUCCH repetition for random access procedures in accordance with various aspects of the present disclosure.

FIG. 4 illustrates an example of a process flow 400 that supports techniques for indicating PUCCH repetition for random access procedures in accordance with various aspects of the present disclosure. The process flow 400 may implement or be implemented by aspects of the wireless communications system 100 or the wireless communications system 200, as described with reference to FIGS. 1 and 2, respectively. For example, the process flow 400 may implement or be implemented by a base station 405 and a UE 415. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400. In the example of FIG. 4, the base station 405 and the UE 415 may perform a two-step RACH procedure.

At 410, the base station 405 may transmit a RACH configuration to the UE 415. The RACH configuration may include an SSB, a SIB, one or more reference signals, or a combination thereof. At 420, the UE 415 may perform synchronization operations, decoding operations, measurement operations, or a combination thereof based on the RACH configuration from the base station 405. For example, the UE 415 may perform a synchronization operation based on receiving the SSB from the base station 405. The UE 415 may also perform a decoding operation based on receiving the SIB from the base station 405. Additionally, the UE 415 may perform a measurement operation based on measuring the one or more reference signals transmitted by the base station 405. In some examples, the UE 415 may determine a PUCCH repetition parameter based on the RACH configuration from the base station 405. For example, the base station 405 may configure the UE 415 with a set of PUCCH repetition parameters via the RACH configuration.

At 425, the UE 415 may transmit a msgA to the base station 405. The msgA may include a RACH preamble and a payload. That is, the msgA may include control information and uplink data. In some examples, the msgA may include information corresponding to a msg1 and a msg3 of a four-step RACH procedure as described with reference to FIG. 3. For example, the msgA may include a RACH preamble (e.g., similar to msg1) and a scheduled uplink data transmission (e.g., similar to msg3). In some examples, the UE 415 may transmit the msgA to the base station 405 on a PUCCH, a PUSCH, or both. At 430, the base station 405 may process the msgA from the UE 415.

At 435, the base station 405 may transmit a msgB to the UE 415. The msgB may include a RACH preamble response and a payload. That is, the msgB may include control information and downlink data. The msgB may include information corresponding to a msg2 and a msg4 of a four-step RACH procedure as described with reference to FIG. 3. The base station 405 may transmit the msgB on a PDCCH, a PDSCH, or both. In some examples, the msgB may include an indication of a PUCCH repetition parameter. For example, the base station 405 may indicate the PUCCH repetition parameter on a PDCCH, a PDSCH, or both. At 440, the UE 415 may process the msgB from the base station 405. For example, the UE 415 may determine a PUCCH repetition parameter based on processing the msgB.

At 445, the UE 415 may transmit feedback (e.g., HARQ-ACK feedback) associated with the msgB to the base station 405 based on a PUCCH repetition parameter. That is, the UE 415 may transmit multiple repetitions (e.g., PUCCH repetitions) of the msgB based on the determined PUCCH repetition parameter. By transmitting multiple repetitions of HARQ-ACK feedback for the msg4 in accordance with a PUCCH repetition parameter, the UE 415 may increase the likelihood of the base station 405 successfully receiving the HARQ-ACK feedback. As a result, the base station 405 and the UE 415 may communicate with increased reliability.

In some examples, the UE 415 may determine the PUCCH repetition parameter based on processing the msgB from the base station 405. In some other examples, the UE 415 may determine the PUCCH repetition parameter based on receiving a RACH configuration (e.g., RMSI) or a DCI message from the base station 405. For example, the base station 405 may transmit a DCI message to the UE 415 (e.g., on a PDCCH) during the two-step RACH procedure and may indicate the PUCCH repetition parameter to the UE 415 in the DCI message. Alternatively, the UE 415 may determine the PUCCH repetition parameter based on a PDCCH aggregation level, a CCE location, a PRI bitfield, or a combination thereof associated with the msgB. In some examples, the PUCCH repetition parameter may correspond to a frequency range, an SCS, a UE capability, or a combination thereof associated with the UE 415. Additionally or alternatively, the PUCCH repetition parameter may correspond to a specific PUCCH format.

Figure 5:
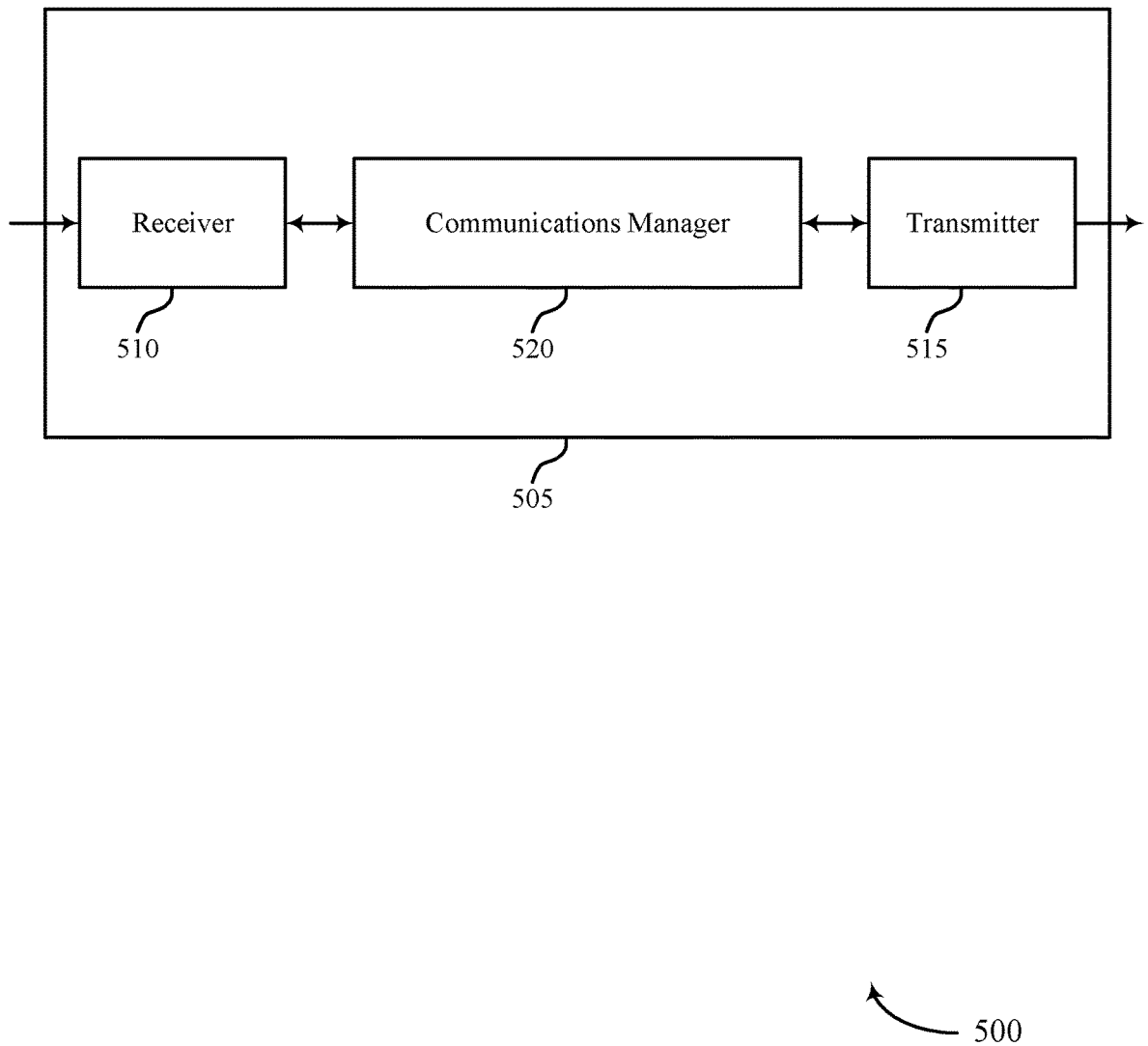
FIG. 5 shows a block diagram of a device that supports techniques for indicating PUCCH repetition for random access procedures in accordance with various aspects of the present disclosure.

FIG. 5 shows a block diagram 500 of a device 505 that supports techniques for indicating PUCCH repetition for random access procedures in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating PUCCH repetition for random access procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating PUCCH repetition for random access procedures). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for indicating PUCCH repetition for random access procedures as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 (e.g., a UE) in accordance with examples as disclosed herein. For example, the communications manager 520 may be configured as or otherwise support a means for receiving, from a network entity, a random access message of a random access procedure. The communications manager 520 may be configured as or otherwise support a means for determining a PUCCH repetition parameter based on the received random access message. The communications manager 520 may be configured as or otherwise support a means for transmitting, to the network entity, feedback information on a PUCCH based on the determined PUCCH repetition parameter.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption based on reducing a number of retransmissions at the device 505. For example, the device 505 may transmit a RACH feedback message with increased reliability based on transmitting multiple PUCCH repetitions of the RACH feedback message in accordance with a PUCCH repetition parameter. As a result, the device 505 may reduce a number of times that the device 505 retransmits the RACH feedback message, thereby increasing the amount of time that the device 505 spends in sleep mode.

Figure 6:
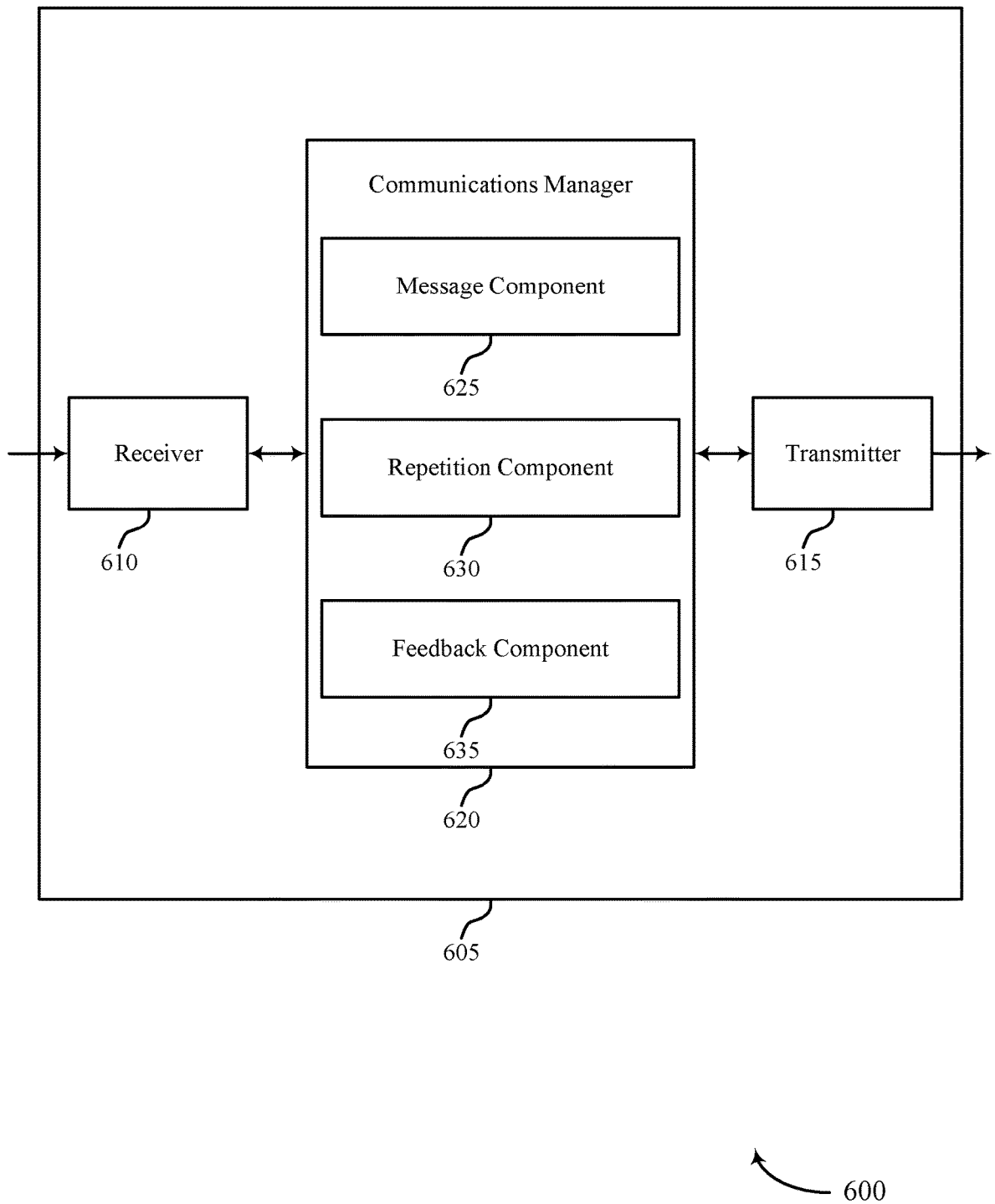
FIG. 6 shows a block diagram of a device that supports techniques for indicating PUCCH repetition for random access procedures in accordance with various aspects of the present disclosure.

FIG. 6 shows a block diagram 600 of a device 605 that supports techniques for indicating PUCCH repetition for random access procedures in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating PUCCH repetition for random access procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating PUCCH repetition for random access procedures). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for indicating PUCCH repetition for random access procedures as described herein. For example, the communications manager 620 may include a message component 625, a repetition component 630, a feedback component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a UE) in accordance with examples as disclosed herein. The message component 625 may be configured as or otherwise support a means for receiving, from a network entity, a random access message of a random access procedure. The repetition component 630 may be configured as or otherwise support a means for determining a PUCCH repetition parameter based on the received random access message. The feedback component 635 may be configured as or otherwise support a means for transmitting, to the network entity, feedback information on a PUCCH based on the determined PUCCH repetition parameter.

Figure 7:
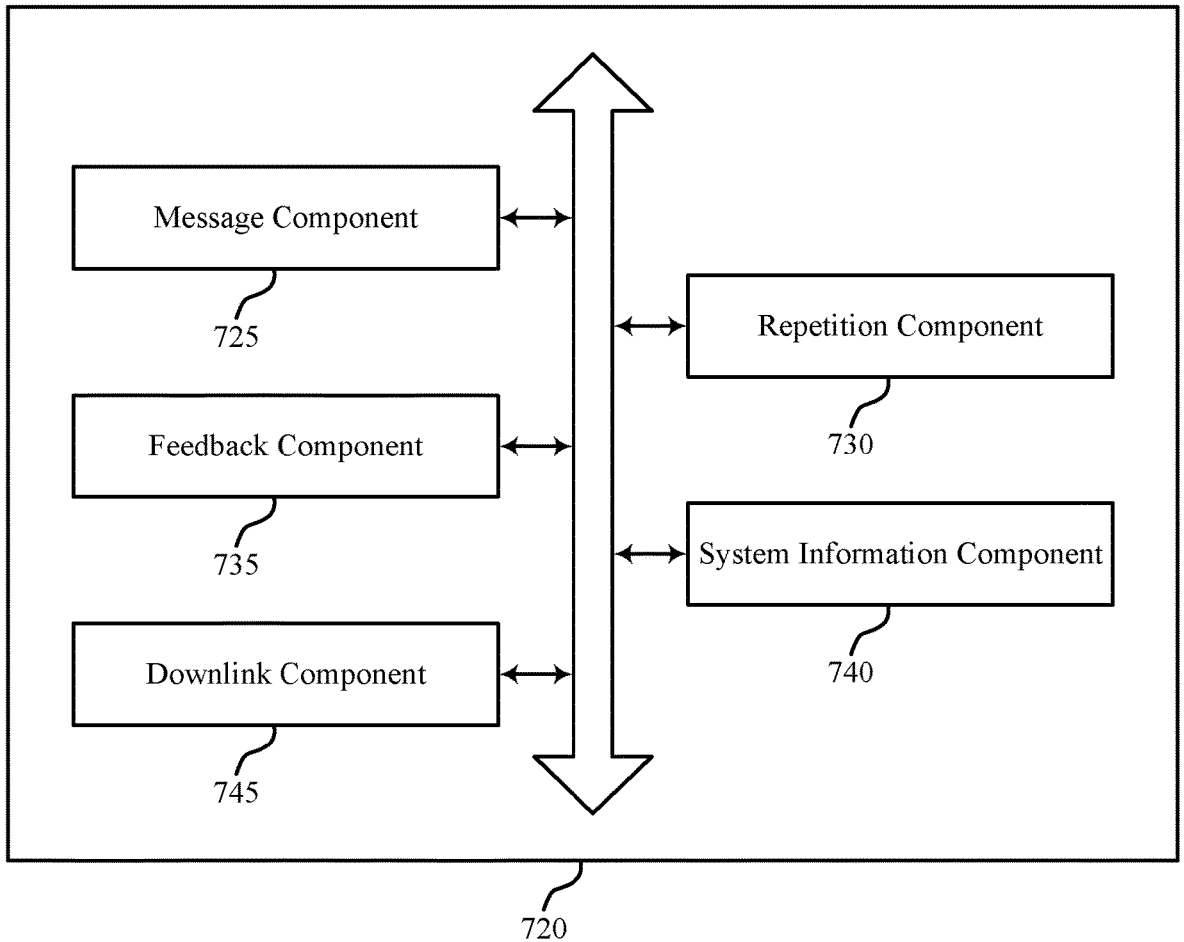
FIG. 7 shows a block diagram of a communications manager that supports techniques for indicating PUCCH repetition for random access procedures in accordance with various aspects of the present disclosure.

FIG. 7 shows a block diagram 700 of a communications manager 720 that supports techniques for indicating PUCCH repetition for random access procedures in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for indicating PUCCH repetition for random access procedures as described herein. For example, the communications manager 720 may include a message component 725, a repetition component 730, a feedback component 735, a system information component 740, a downlink component 745, or any combination thereof. Each of these components may communicate, directly or indirectly, with one another (e.g., via one or more buses).

The communications manager 720 may support wireless communication at a UE in accordance with examples as disclosed herein. The message component 725 may be configured as or otherwise support a means for receiving, from a network entity, a random access message of a random access procedure. The repetition component 730 may be configured as or otherwise support a means for determining a PUCCH repetition parameter based on the received random access message. The feedback component 735 may be configured as or otherwise support a means for transmitting, to the network entity, feedback information on a PUCCH based on the determined PUCCH repetition parameter. In some examples, the random access message includes an indication of the PUCCH repetition parameter.

The downlink component 745 may be configured as or otherwise support a means for receiving the random access message including the indication of the PUCCH repetition parameter on a PDSCH. In some examples, the random access procedure includes a two-step random access procedure and the random access message includes a msgB associated with the two-step random access procedure. In some examples, the random access procedure includes a four-step random access procedure and the random access message includes a msg4 associated with the four-step random access procedure.

In some examples, the downlink component 745 may be configured as or otherwise support a means for receiving the random access message including the indication of the PUCCH repetition parameter on a PDCCH. In some examples, the random access procedure includes a two-step random access procedure and the random access message includes a msgB associated with the two-step random access procedure. In some examples, the random access procedure includes a four-step random access procedure and the random access message includes a msg4 associated with the four-step random access procedure.

In some examples, the downlink component 745 may be configured as or otherwise support a means for receiving DCI on the PDCCH during the random access procedure, the DCI including a DCI bitfield indicating the PUCCH repetition parameter. In some examples, the repetition component 730 may be configured as or otherwise support a means for determining the PUCCH repetition parameter based on one or more of an aggregation level associated with the PDCCH or a CCE location associated with the PDCCH. In some examples, the repetition component 730 may be configured as or otherwise support a means for determining the PUCCH repetition parameter based on a PRI bitfield.

The system information component 740 may be configured as or otherwise support a means for receiving, from the network entity, a SIB including system information indicating a PUCCH repetition configuration including a set of PUCCH repetition parameters. In some examples, the system information component 740 may be configured as or otherwise support a means for selecting the PUCCH repetition parameter from the set of PUCCH repetition parameters based on the received random access message. The system information includes RMSI.

In some examples, the PUCCH repetition parameter corresponds to a PUCCH format. In some examples, the PUCCH repetition parameter corresponds to one or more of a frequency range or a SCS. In some examples, the random access procedure includes a two-step random access procedure or a four-step random access procedure. In some examples, the feedback information includes a HARQ-ACK.

Figure 8:
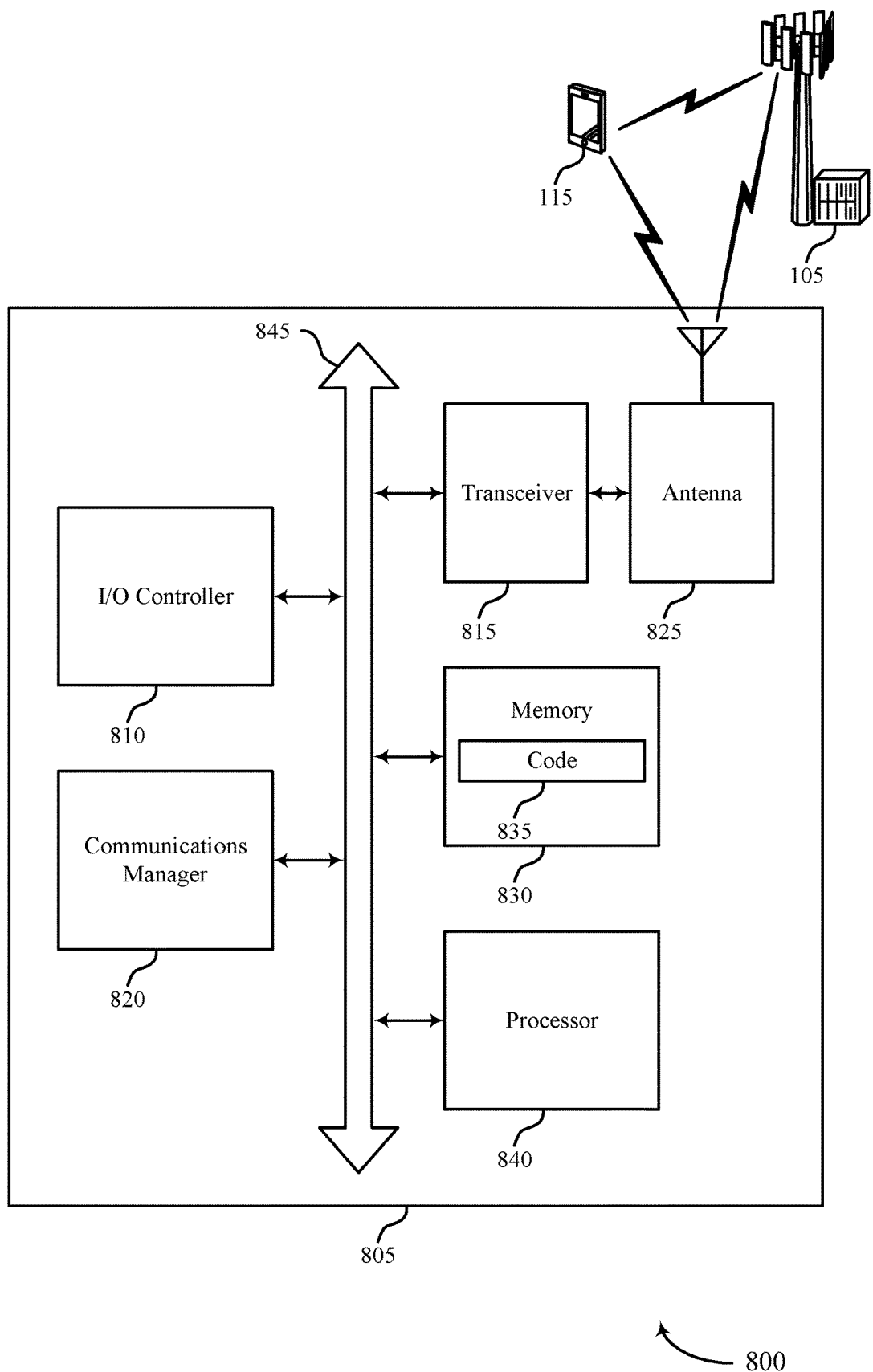
FIG. 8 shows a diagram of a system including a device that supports techniques for indicating PUCCH repetition for random access procedures in accordance with various aspects of the present disclosure.

FIG. 8 shows a diagram of a system 800 including a device 805 that supports techniques for indicating PUCCH repetition for random access procedures in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, one or more antennas 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

The device 805 may include one or more antennas 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating PUCCH repetition for random access procedures). For example, the device 805 or a component of the device 805 may include a processor 840 and memory 830 coupled to the processor 840, the processor 840 and memory 830 configured to perform various functions described herein.

The communications manager 820 may support wireless communication at the device 805 (e.g., a UE) in accordance with examples as disclosed herein. For example, the communications manager 820 may be configured as or otherwise support a means for receiving, from a network entity, a random access message of a random access procedure. The communications manager 820 may be configured as or otherwise support a means for determining a PUCCH repetition parameter based on the received random access message. The communications manager 820 may be configured as or otherwise support a means for transmitting, to the network entity, feedback information on a PUCCH based on the determined PUCCH repetition parameter.

By including or configuring the communications manager 820 in accordance with examples as described herein, the device 805 may support techniques for improved communication reliability based on transmitting multiple PUCCH repetitions of a RACH feedback message in accordance with a PUCCH repetition parameter. Transmitting multiple PUCCH repetitions of the RACH feedback message may increase the likelihood that the RACH feedback message is successfully received, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for indicating PUCCH repetition for random access procedures as described herein, or the processor 840 and the memory 830 may be otherwise configured to perform or support such operations.

Figure 9:
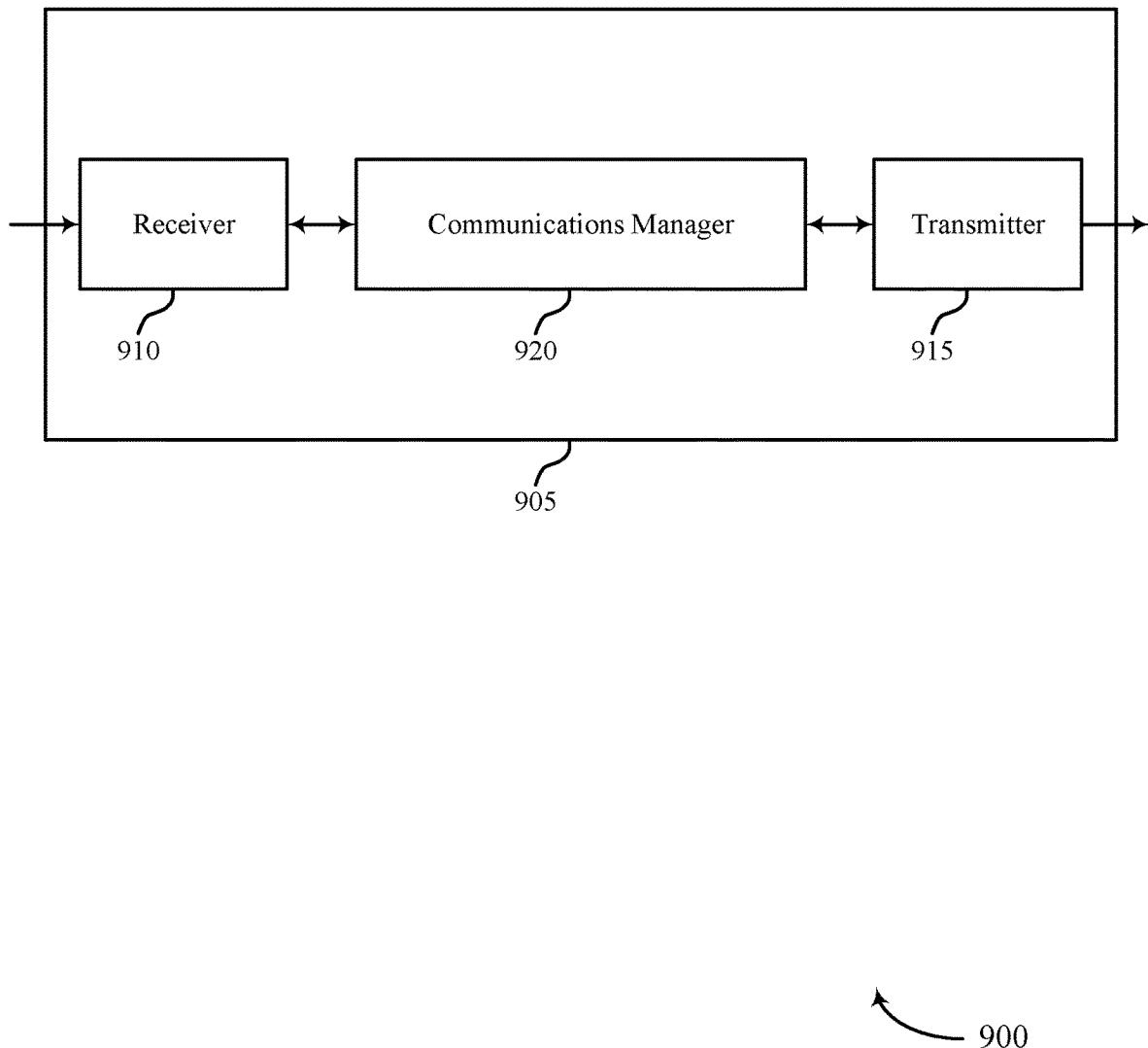
FIG. 9 shows a block diagram of a device that supports techniques for indicating PUCCH repetition for random access procedures in accordance with various aspects of the present disclosure.

FIG. 9 shows a block diagram 900 of a device 905 that supports techniques for indicating PUCCH repetition for random access procedures in accordance with various aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating PUCCH repetition for random access procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating PUCCH repetition for random access procedures). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for indicating PUCCH repetition for random access procedures as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a base station) in accordance with examples as disclosed herein. For example, the communications manager 920 may be configured as or otherwise support a means for transmitting, to a UE, a random access message of a random access procedure. The communications manager 920 may be configured as or otherwise support a means for receiving, from the UE, feedback information via a PUCCH based on a PUCCH repetition parameter.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption based on reducing a number of retransmissions requested by the device 905. For example, the device 905 may receive multiple PUCCH repetitions of a RACH feedback message, which may increase the likelihood of the device 905 successfully decoding the RACH feedback message. As a result, the device 905 may request fewer retransmissions of the RACH feedback message, thereby increasing the amount of time that the device 905 spends in sleep mode.

Figure 10:
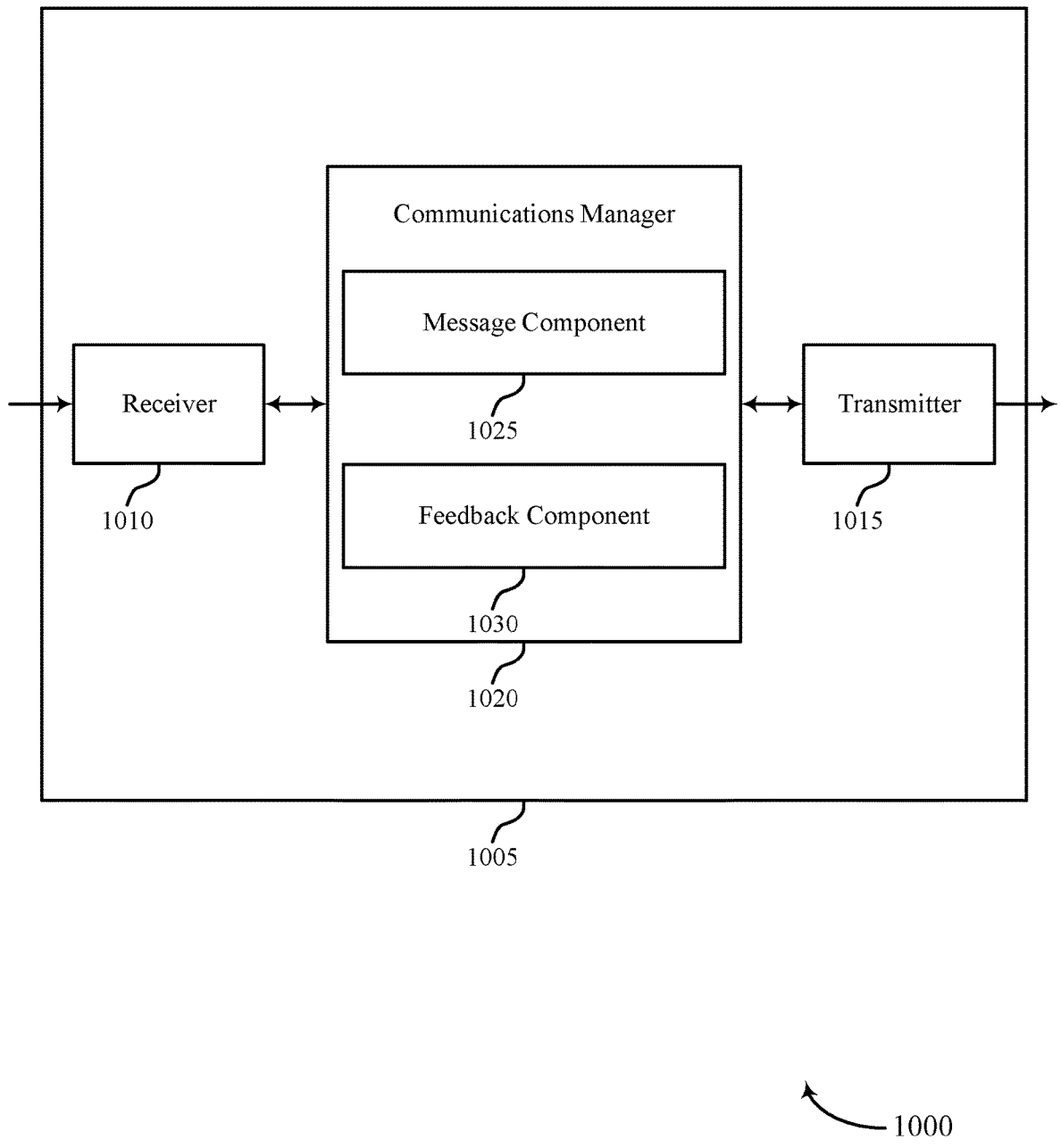
FIG. 10 shows a block diagram of a device that supports techniques for indicating PUCCH repetition for random access procedures in accordance with various aspects of the present disclosure.

FIG. 10 shows a block diagram 1000 of a device 1005 that supports techniques for indicating PUCCH repetition for random access procedures in accordance with various aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating PUCCH repetition for random access procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating PUCCH repetition for random access procedures). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for indicating PUCCH repetition for random access procedures as described herein. For example, the communications manager 1020 may include a message component 1025 a feedback component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a base station) in accordance with examples as disclosed herein. The message component 1025 may be configured as or otherwise support a means for transmitting, to a UE, a random access message of a random access procedure. The feedback component 1030 may be configured as or otherwise support a means for receiving, from the UE, feedback information via a PUCCH based on a PUCCH repetition parameter.

Figure 11:
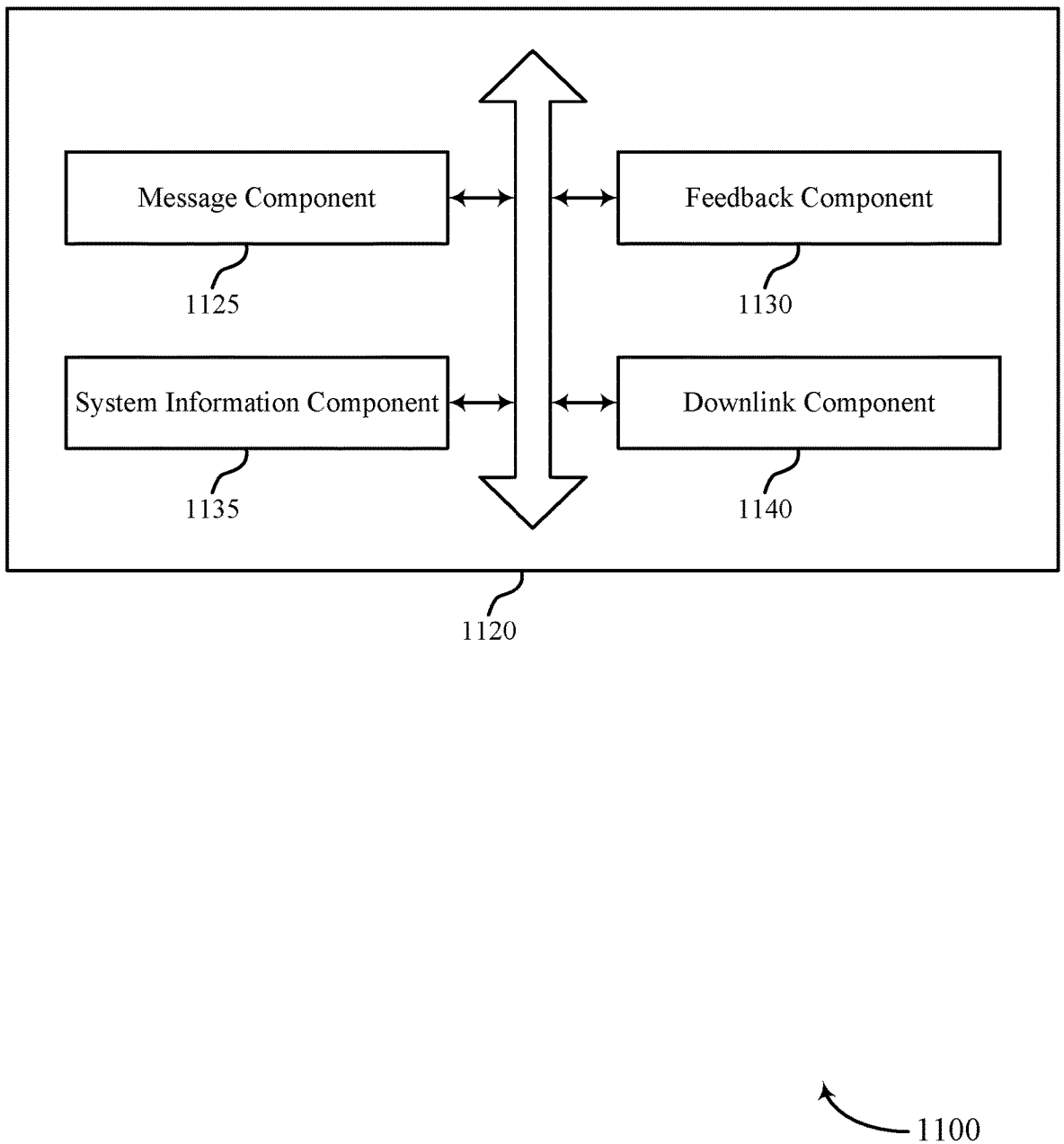
FIG. 11 shows a block diagram of a communications manager that supports techniques for indicating PUCCH repetition for random access procedures in accordance with various aspects of the present disclosure.

FIG. 11 shows a block diagram 1100 of a communications manager 1120 that supports techniques for indicating PUCCH repetition for random access procedures in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for indicating PUCCH repetition for random access procedures as described herein. For example, the communications manager 1120 may include a message component 1125, a feedback component 1130, a system information component 1135, a downlink component 1140, or any combination thereof. Each of these components may communicate, directly or indirectly, with one another (e.g., via one or more buses).

The communications manager 1120 may support wireless communication at a base station in accordance with examples as disclosed herein. The message component 1125 may be configured as or otherwise support a means for transmitting, to a UE, a random access message of a random access procedure. The feedback component 1130 may be configured as or otherwise support a means for receiving, from the UE, feedback information via a PUCCH based on a PUCCH repetition parameter. In some examples, the random access message includes an indication of the PUCCH repetition parameter.

The downlink component 1140 may be configured as or otherwise support a means for transmitting the random access message including the indication of the PUCCH repetition parameter on a PDSCH. In some examples, the random access procedure includes a two-step random access procedure and the random access message includes a msgB associated with the two-step random access procedure. In some examples, the random access procedure includes a four-step random access procedure and the random access message includes a msg4 associated with the four-step random access procedure.

In some examples, the downlink component 1140 may be configured as or otherwise support a means for transmitting the random access message including the indication of the PUCCH repetition parameter on a PDCCH. In some examples, the random access procedure includes a two-step random access procedure and the random access message includes a msgB associated with the two-step random access procedure. In some examples, the random access procedure includes a four-step random access procedure and the random access message includes a msg4 associated with the four-step random access procedure. In some examples, the downlink component 1140 may be configured as or otherwise support a means for transmitting DCI on the PDCCH during the random access procedure, the DCI including a DCI bitfield indicating the PUCCH repetition parameter.

The system information component 1135 may be configured as or otherwise support a means for transmitting, to the UE, a SIB including system information indicating a PUCCH repetition configuration including a set of PUCCH repetition parameters including the PUCCH repetition parameter. The system information includes RMSI. In some examples, the PUCCH repetition parameter corresponds to a PUCCH format. In some examples, the PUCCH repetition parameter corresponds to one or more of a frequency range or a SCS. In some examples, the random access procedure includes a two-step random access procedure or a four-step random access procedure. In some examples, the feedback information includes a HARQ-ACK.

Figure 12:
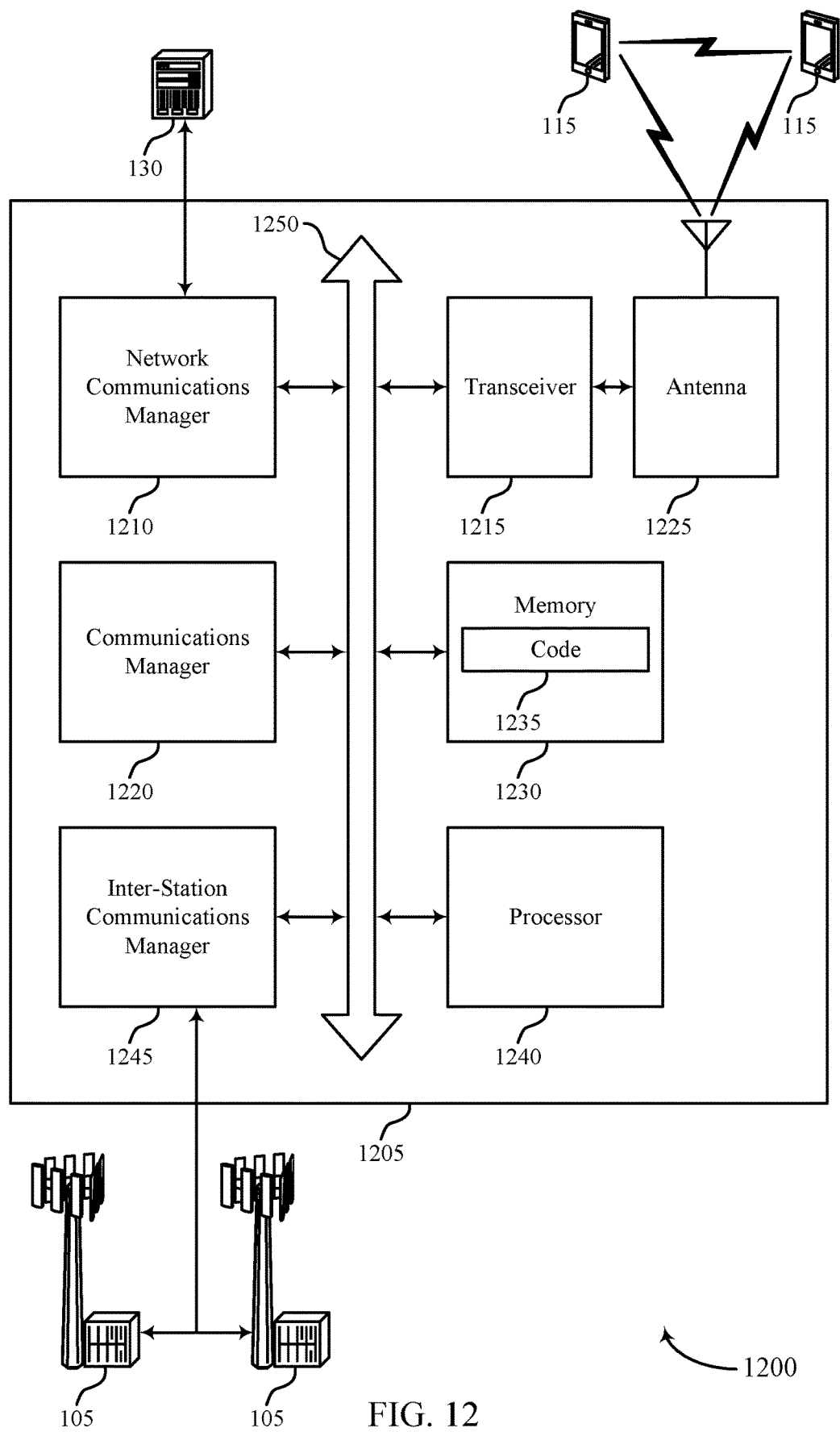
FIG. 12 shows a diagram of a system including a device that supports techniques for indicating PUCCH repetition for random access procedures in accordance with various aspects of the present disclosure.

FIG. 12 shows a diagram of a system 1200 including a device 1205 that supports techniques for indicating PUCCH repetition for random access procedures in accordance with various aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, one or more antennas 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

The device 1205 may include one or more antennas 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for indicating PUCCH repetition for random access procedures). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at the device 1205 (e.g., a base station) in accordance with examples as disclosed herein. For example, the communications manager 1220 may be configured as or otherwise support a means for transmitting, to a UE, a random access message of a random access procedure. The communications manager 1220 may be configured as or otherwise support a means for receiving, from the UE, feedback information via a PUCCH based on a PUCCH repetition parameter.

By including or configuring the communications manager 1220 in accordance with examples as described herein, the device 1205 may support techniques for improved communication reliability based on receiving multiple PUCCH repetitions of a RACH feedback message. Receiving multiple PUCCH repetitions of the RACH feedback message may increase the likelihood of the device 1205 successfully decoding the RACH feedback message, thereby improving the reliability of communications at the device 1205.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for indicating PUCCH repetition for random access procedures as described herein, or the processor 1240 and the memory 1230 may be otherwise configured to perform or support such operations.

Figure 13:
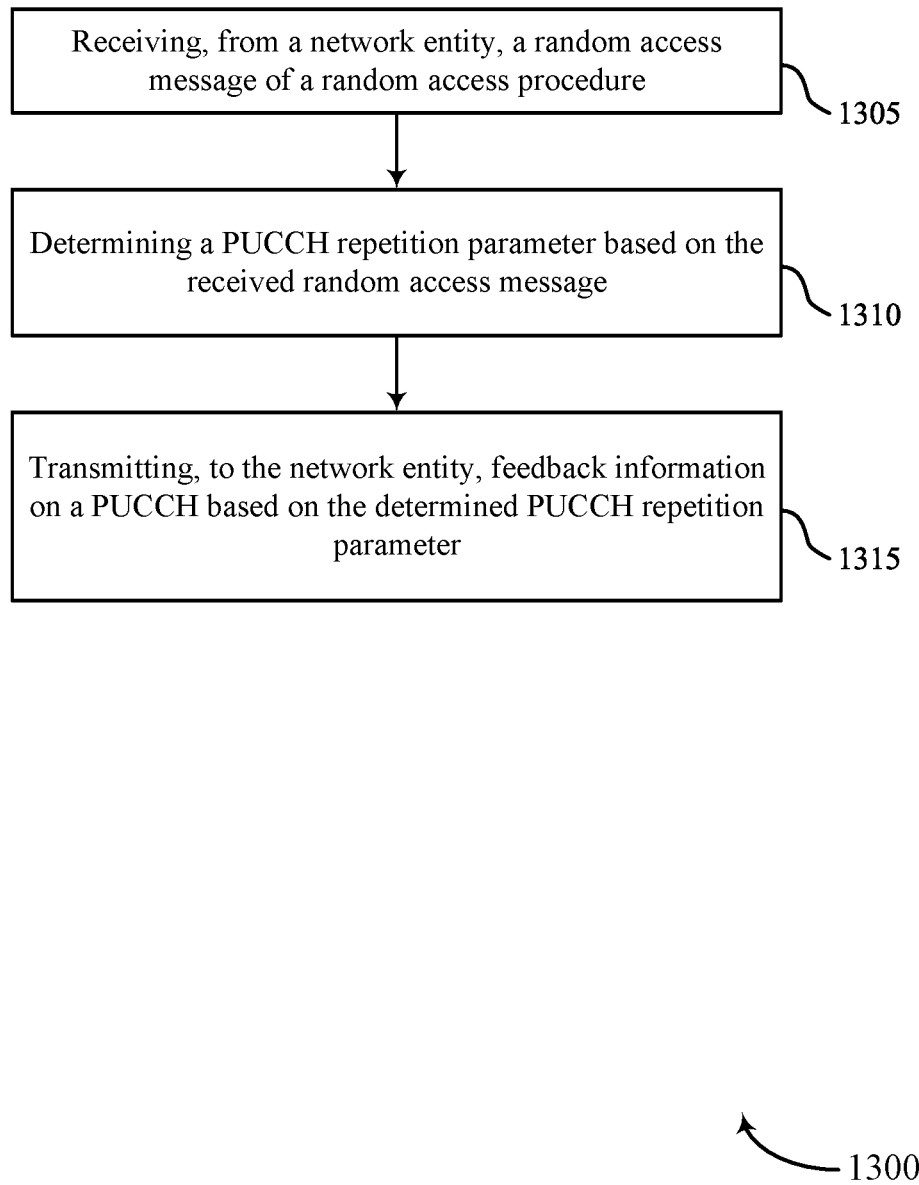
FIG. 13 shows a flowchart illustrating a method that supports techniques for indicating PUCCH repetition for random access procedures in accordance with various aspects of the present disclosure.

FIG. 13 shows a flowchart illustrating a method 1300 that supports techniques for indicating PUCCH repetition for random access procedures in accordance with various aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a network entity, a random access message of a random access procedure. The operations of 1305 may be performed in accordance with examples as disclosed herein. In some examples, aspects of the operations of 1305 may be performed by a message component 725 as described with reference to FIG. 7.

At 1310, the method may include determining a PUCCH repetition parameter based on the received random access message. The operations of 1310 may be performed in accordance with examples as disclosed herein. In some examples, aspects of the operations of 1310 may be performed by a repetition component 730 as described with reference to FIG. 7.

At 1315, the method may include transmitting, to the network entity, feedback information on a PUCCH based on the determined PUCCH repetition parameter. The operations of 1315 may be performed in accordance with examples as disclosed herein. In some examples, aspects of the operations of 1315 may be performed by a feedback component 735 as described with reference to FIG. 7.

Figure 14:
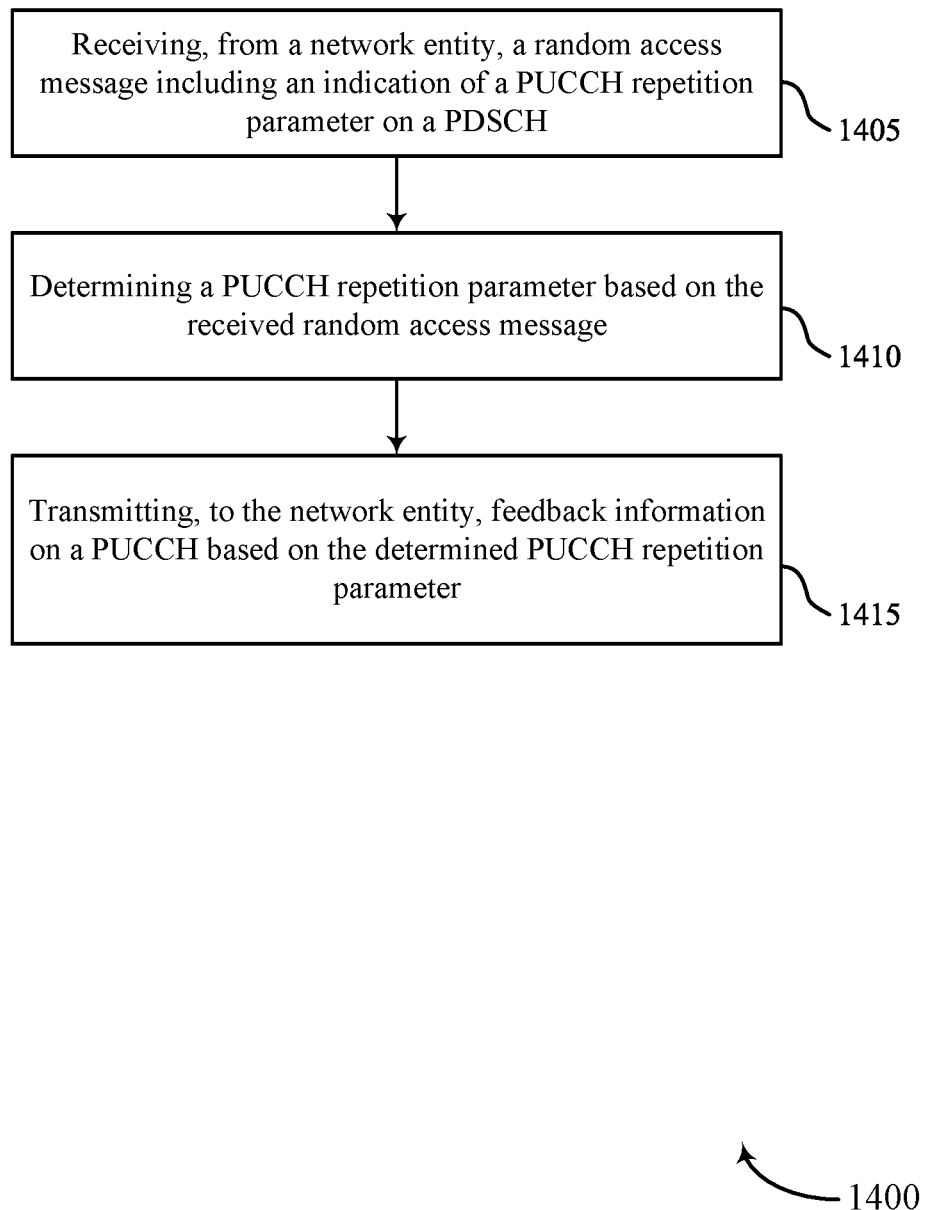
FIG. 14 shows a flowchart illustrating a method that supports techniques for indicating PUCCH repetition for random access procedures in accordance with various aspects of the present disclosure.

FIG. 14 shows a flowchart illustrating a method 1400 that supports techniques for indicating PUCCH repetition for random access procedures in accordance with various aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a network entity, a random access message including an indication of a PUCCH repetition parameter on a PDSCH. The operations of 1405 may be performed in accordance with examples as disclosed herein. In some examples, aspects of the operations of 1405 may be performed by a downlink component 745 as described with reference to FIG. 7.

At 1410, the method may include determining a PUCCH repetition parameter based on the received random access message. The operations of 1410 may be performed in accordance with examples as disclosed herein. In some examples, aspects of the operations of 1410 may be performed by a repetition component 730 as described with reference to FIG. 7.

At 1415, the method may include transmitting, to the network entity, feedback information on a PUCCH based on the determined PUCCH repetition parameter. The operations of 1415 may be performed in accordance with examples as disclosed herein. In some examples, aspects of the operations of 1415 may be performed by a feedback component 735 as described with reference to FIG. 7.

Figure 15:
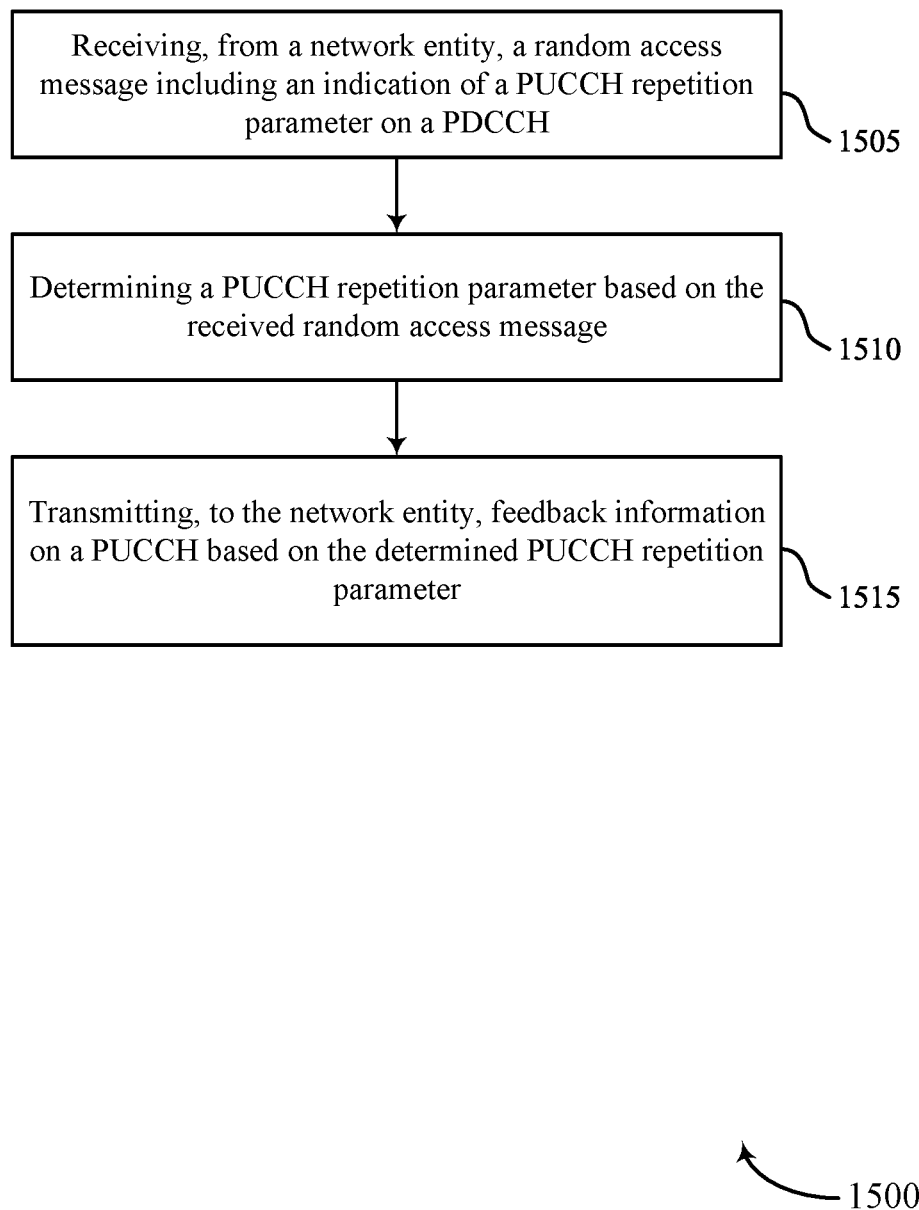
FIG. 15 shows a flowchart illustrating a method that supports techniques for indicating PUCCH repetition for random access procedures in accordance with various aspects of the present disclosure.

FIG. 15 shows a flowchart illustrating a method 1500 that supports techniques for indicating PUCCH repetition for random access procedures in accordance with various aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a random access message including an indication of a PUCCH repetition parameter on a PDCCH. The operations of 1510 may be performed in accordance with examples as disclosed herein. In some examples, aspects of the operations of 1510 may be performed by a downlink component 745 as described with reference to FIG. 7.

At 1510, the method may include determining a PUCCH repetition parameter based on the received random access message. The operations of 1510 may be performed in accordance with examples as disclosed herein. In some examples, aspects of the operations of 1510 may be performed by a repetition component 730 as described with reference to FIG. 7.

At 1515, the method may include transmitting, to the network entity, feedback information on a PUCCH based on the determined PUCCH repetition parameter. The operations of 1515 may be performed in accordance with examples as disclosed herein. In some examples, aspects of the operations of 1515 may be performed by a feedback component 735 as described with reference to FIG. 7.

Figure 16:
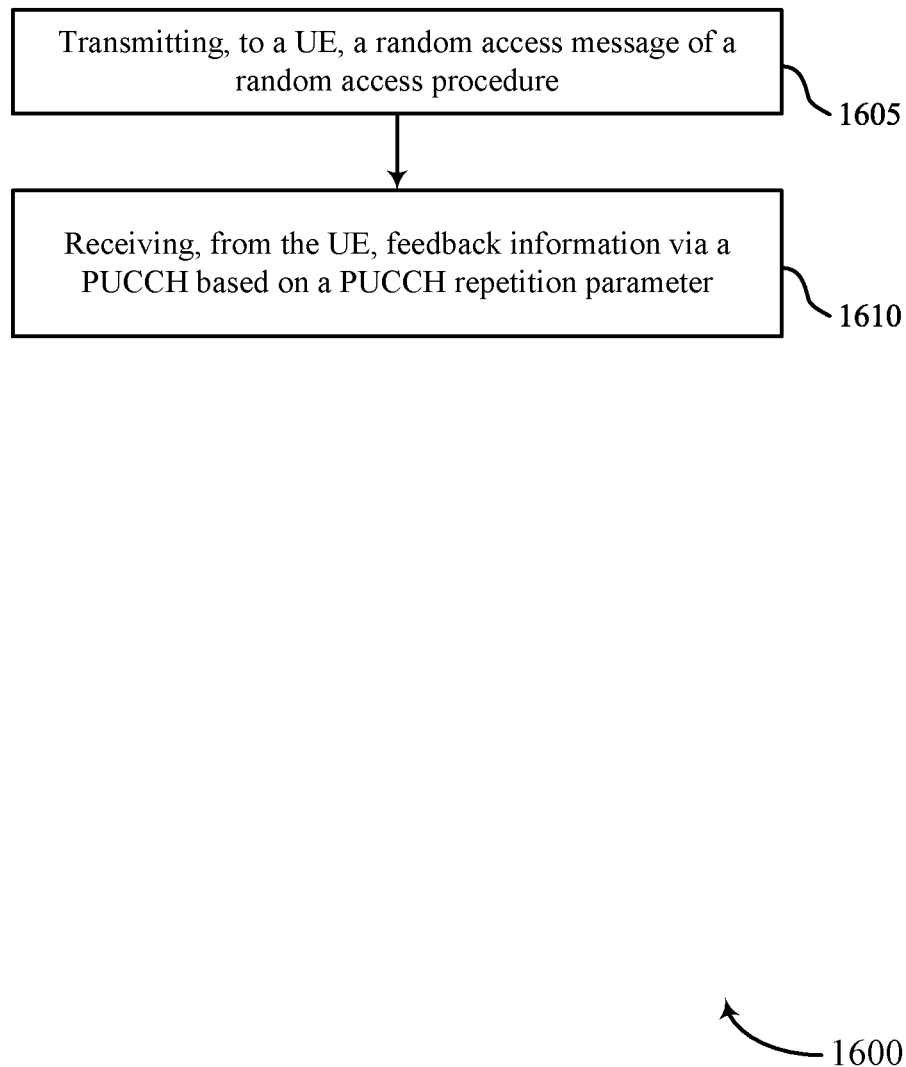
FIG. 16 shows a flowchart illustrating a method that supports techniques for indicating PUCCH repetition for random access procedures in accordance with various aspects of the present disclosure.

FIG. 16 shows a flowchart illustrating a method 1600 that supports techniques for indicating PUCCH repetition for random access procedures in accordance with various aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a random access message of a random access procedure. The operations of 1605 may be performed in accordance with examples as disclosed herein. In some examples, aspects of the operations of 1605 may be performed by a message component 1125 as described with reference to FIG. 11.

At 1610, the method may include receiving, from the UE, feedback information via a PUCCH based on a PUCCH repetition parameter. The operations of 1610 may be performed in accordance with examples as disclosed herein. In some examples, aspects of the operations of 1610 may be performed by a feedback component 1130 as described with reference to FIG. 11.

Figure 17:
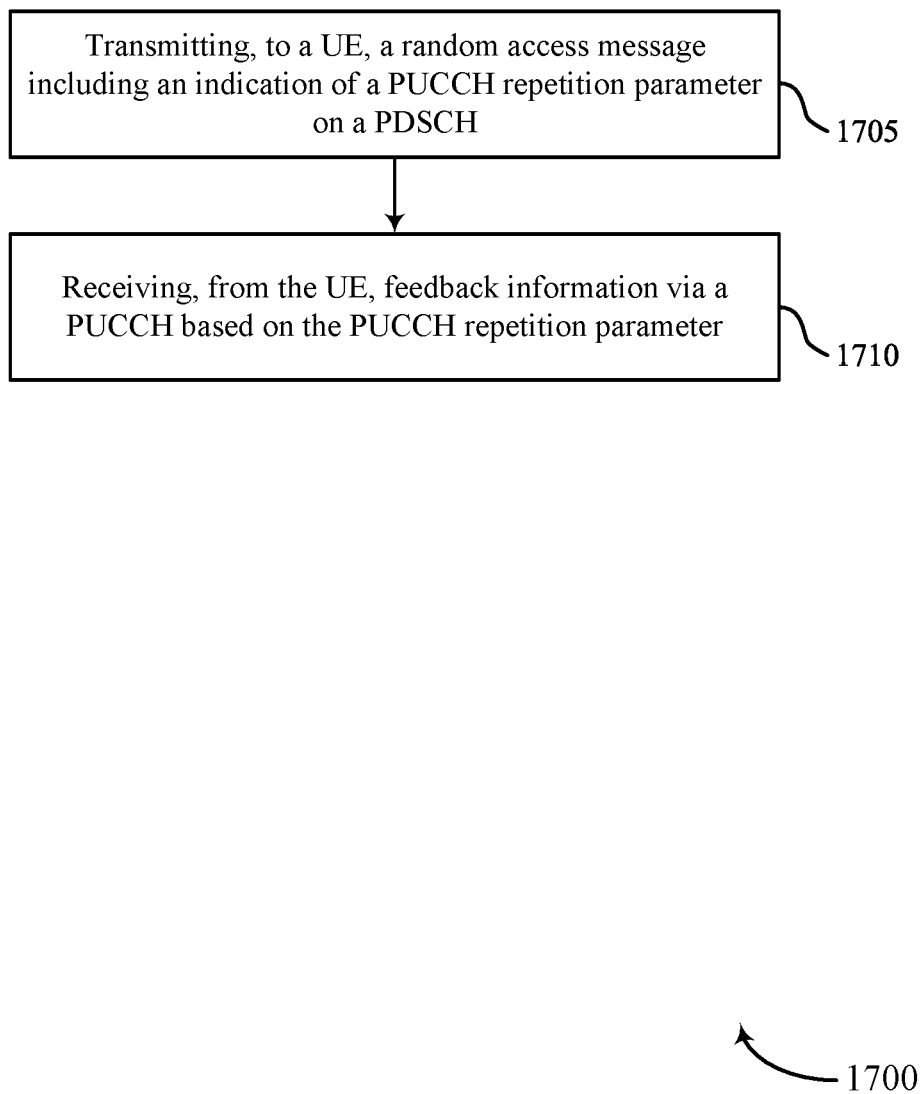
FIG. 17 shows a flowchart illustrating a method that supports techniques for indicating PUCCH repetition for random access procedures in accordance with various aspects of the present disclosure.

FIG. 17 shows a flowchart illustrating a method 1700 that supports techniques for indicating PUCCH repetition for random access procedures in accordance with various aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a random access message including an indication of a PUCCH repetition parameter on a PDSCH. The operations of 1705 may be performed in accordance with examples as disclosed herein. In some examples, aspects of the operations of 1705 may be performed by a downlink component 1140 as described with reference to FIG. 11.

At 1710, the method may include receiving, from the UE, feedback information via a PUCCH based on the determined PUCCH repetition parameter. The operations of 1710 may be performed in accordance with examples as disclosed herein. In some examples, aspects of the operations of 1710 may be performed by a feedback component 1130 as described with reference to FIG. 11.

Figure 18:
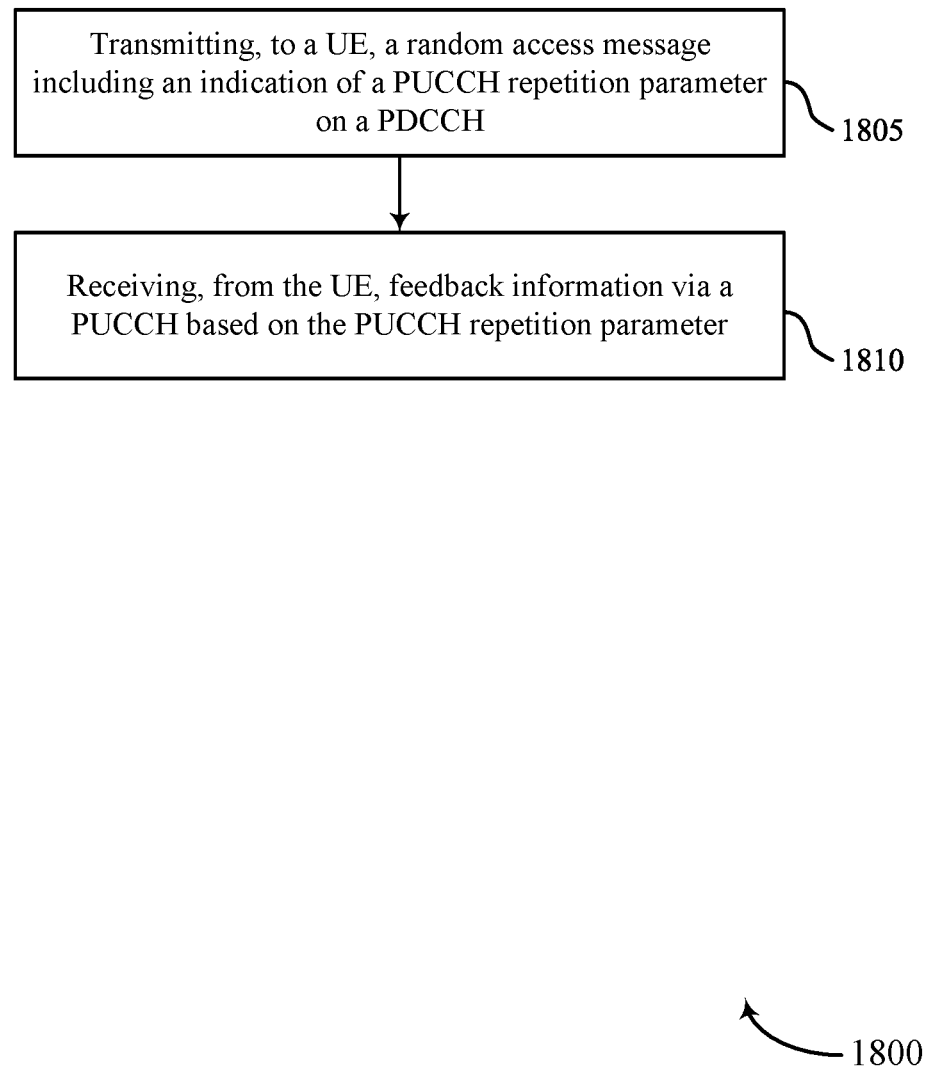
FIG. 18 shows a flowchart illustrating a method that supports techniques for indicating PUCCH repetition for random access procedures in accordance with various aspects of the present disclosure.

FIG. 18 shows a flowchart illustrating a method 1800 that supports techniques for indicating PUCCH repetition for random access procedures in accordance with various aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a random access message including an indication of a PUCCH repetition parameter on a PDCCH. The operations of 1805 may be performed in accordance with examples as disclosed herein. In some examples, aspects of the operations of 1805 may be performed by a downlink component 1140 as described with reference to FIG. 11.

At 1810, the method may include receiving, from the UE, feedback information via a PUCCH based on the determined PUCCH repetition parameter. The operations of 1810 may be performed in accordance with examples as disclosed herein. In some examples, aspects of the operations of 1810 may be performed by a feedback component 1130 as described with reference to FIG. 11.

The following provides an overview of aspects of the present disclosure:

Aspect 1: A method for wireless communication at a UE, comprising: receiving, from a network entity, a random access message of a random access procedure; determining a PUCCH repetition parameter based at least in part on the received random access message; and transmitting, to the network entity, feedback information on a PUCCH based at least in part on the determined PUCCH repetition parameter.

Aspect 2: The method of aspect 1, wherein the random access message includes an indication of the PUCCH repetition parameter.

Aspect 3: The method of aspect 2, further comprising: receiving the random access message including the indication of the PUCCH repetition parameter on a PDSCH.

Aspect 4: The method of aspect 3, wherein the random access procedure includes a two-step random access procedure and the random access message includes a message B associated with the two-step random access procedure.

Aspect 5: The method of any of aspects 3 through 4, wherein the random access procedure includes a four-step random access procedure and the random access message includes a message 4 associated with the four-step random access procedure.

Aspect 6: The method of any of aspects 2 through 5, further comprising: receiving the random access message including the indication of the PUCCH repetition parameter on a PDCCH.

Aspect 7: The method of aspect 6, wherein the random access procedure includes a two-step random access procedure and the random access message includes a message B associated with the two-step random access procedure.

Aspect 8: The method of any of aspects 6 through 7, wherein the random access procedure includes a four-step random access procedure and the random access message includes a message 4 associated with the four-step random access procedure.

Aspect 9: The method of any of aspects 6 through 8, further comprising: receiving DCI on the PDCCH during the random access procedure, the DCI including a DCI bitfield indicating the PUCCH repetition parameter.

Aspect 10: The method of any of aspects 6 through 9, further comprising: determining the PUCCH repetition parameter based at least in part on one or more of an aggregation level associated with the PDCCH or a CCE location associated with the PDCCH.

Aspect 11: The method of any of aspects 6 through 10, further comprising: determining the PUCCH repetition parameter based at least in part on a PUCCH resource indicator bitfield.

Aspect 12: The method of any of aspects 1 through 11, further comprising: receiving, from the network entity, a SIB including system information indicating a PUCCH repetition configuration including a set of PUCCH repetition parameters.

Aspect 13: The method of aspect 12, further comprising: selecting the PUCCH repetition parameter from the set of PUCCH repetition parameters based at least in part on the received random access message, wherein the system information includes RMSI.

Aspect 14: The method of any of aspects 1 through 13, wherein the PUCCH repetition parameter corresponds to a PUCCH format.

Aspect 15: The method of any of aspects 1 through 14, wherein the PUCCH repetition parameter corresponds to one or more of a frequency range or a SCS.

Aspect 16: The method of any of aspects 1 through 15, wherein the random access procedure includes a two-step random access procedure or a four-step random access procedure.

Aspect 17: The method of any of aspects 1 through 16, wherein the feedback information includes a HARQ-ACK.

Aspect 18: A method for wireless communication at a network entity, comprising: transmitting, to a UE, a random access message of a random access procedure; and receiving, from the UE, feedback information via a PUCCH based at least in part on a PUCCH repetition parameter.

Aspect 19: The method of aspect 18, wherein the random access message includes an indication of the PUCCH repetition parameter.

Aspect 20: The method of aspect 19, further comprising: transmitting the random access message including the indication of the PUCCH repetition parameter on a PDSCH.

Aspect 21: The method of aspect 20, wherein the random access procedure includes a two-step random access procedure and the random access message includes a message B associated with the two-step random access procedure.

Aspect 22: The method of any of aspects 20 through 21, wherein the random access procedure includes a four-step random access procedure and the random access message includes a message 4 associated with the four-step random access procedure.

Aspect 23: The method of any of aspects 19 through 22, further comprising: transmitting the random access message including the indication of the PUCCH repetition parameter on a PDCCH.

Aspect 24: The method of aspect 23, wherein the random access procedure includes a two-step random access procedure and the random access message includes a message B associated with the two-step random access procedure.

Aspect 25: The method of any of aspects 23 through 24, wherein the random access procedure includes a four-step random access procedure and the random access message includes a message 4 associated with the four-step random access procedure.

Aspect 26: The method of any of aspects 23 through 25, further comprising: transmitting DCI on the PDCCH during the random access procedure, the DCI including a DCI bitfield indicating the PUCCH repetition parameter.

Aspect 27: The method of any of aspects 18 through 26, further comprising: transmitting, to the UE, a SIB including system information indicating a PUCCH repetition configuration including a set of PUCCH repetition parameters including the PUCCH repetition parameter, wherein the system information includes RMSI.

Aspect 28: The method of any of aspects 18 through 27, wherein the PUCCH repetition parameter corresponds to a PUCCH format.

Aspect 29: The method of any of aspects 18 through 28, wherein the PUCCH repetition parameter corresponds to one or more of a frequency range or a SCS.

Aspect 30: The method of any of aspects 18 through 29, wherein the random access procedure includes a two-step random access procedure or a four-step random access procedure.

Aspect 31: The method of any of aspects 18 through 30, wherein the feedback information includes a HARQ-ACK.

Aspect 32: An apparatus for wireless communication at a UE, comprising a processor; memory coupled with the processor; and instructions stored in the memory and executable by the processor to cause the apparatus to perform a method of any of aspects 1 through 17.

Aspect 33: An apparatus for wireless communication at a UE, comprising at least one means for performing a method of any of aspects 1 through 17.

Aspect 34: A non-transitory computer-readable medium storing code for wireless communication at a UE, the code comprising instructions executable by a processor to perform a method of any of aspects 1 through 17.

Aspect 35: An apparatus for wireless communication at a network entity, comprising a processor; memory coupled with the processor; and instructions stored in the memory and executable by the processor to cause the apparatus to perform a method of any of aspects 18 through 31.

Aspect 36: An apparatus for wireless communication at a network entity, comprising at least one means for performing a method of any of aspects 18 through 31.

Aspect 37: A non-transitory computer-readable medium storing code for wireless communication at a network entity, the code comprising instructions executable by a processor to perform a method of any of aspects 18 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, a random access message of a random access procedure, the random access message including an indication of a physical uplink control channel repetition parameter;
   determining the physical uplink control channel repetition parameter based at least in part on the received random access message including the indication; and
   transmitting, to the network entity, feedback information associated with the received random access message on a physical uplink control channel based at least in part on the determined physical uplink control channel repetition parameter.

2. The method of claim 1, further comprising:
   receiving the random access message including the indication of the physical uplink control channel repetition parameter on a physical downlink shared channel.

3. The method of claim 2, wherein the random access procedure includes a two-step random access procedure and the random access message includes a message B associated with the two-step random access procedure.

4. The method of claim 2, wherein the random access procedure includes a four-step random access procedure and the random access message includes a message 4 associated with the four-step random access procedure.

5. The method of claim 1, further comprising:
   receiving the random access message including the indication of the physical uplink control channel repetition parameter on a physical downlink control channel.

6. The method of claim 5, wherein the random access procedure includes a two-step random access procedure and the random access message includes a message B associated with the two-step random access procedure.

7. The method of claim 5, wherein the random access procedure includes a four-step random access procedure and the random access message includes a message 4 associated with the four-step random access procedure.

8. The method of claim 5, further comprising:
   receiving downlink control information on the physical downlink control channel during the random access procedure, the downlink control information including a downlink control information bitfield indicating the physical uplink control channel repetition parameter.

9. The method of claim 5, further comprising:
   determining the physical uplink control channel repetition parameter based at least in part on one or more of an aggregation level associated with the physical downlink control channel or a control channel element location associated with the physical downlink control channel.

10. The method of claim 5, further comprising:
    determining the physical uplink control channel repetition parameter based at least in part on a physical uplink control channel resource indicator bitfield.

11. The method of claim 1, further comprising:
    receiving, from the network entity, a system information block including system information indicating a physical uplink control channel repetition configuration including a set of physical uplink control channel repetition parameters.

12. The method of claim 11, further comprising:
    selecting the physical uplink control channel repetition parameter from the set of physical uplink control channel repetition parameters based at least in part on the received random access message, wherein the system information includes remaining minimum system information.

13. The method of claim 1, wherein the physical uplink control channel repetition parameter corresponds to a physical uplink control channel format, a frequency range, a subcarrier spacing, or a combination thereof.

14. The method of claim 1, wherein:
    the random access procedure includes a two-step random access procedure or a four-step random access procedure; and
    the feedback information includes a hybrid automatic repeat request acknowledgment.

15. A method for wireless communication at a network entity, comprising:
    transmitting, to a user equipment (UE), a random access message of a random access procedure, the random access message including an indication of a physical uplink control channel repetition parameter; and
    receiving, from the UE, feedback information associated with the random access message via a physical uplink control channel based at least in part on the physical uplink control channel repetition parameter.

16. The method of claim 15, further comprising:
    transmitting the random access message including the indication of the physical uplink control channel repetition parameter on a physical downlink shared channel.

17. The method of claim 16, wherein the random access procedure includes a two-step random access procedure and the random access message includes a message B associated with the two-step random access procedure.

18. The method of claim 16, wherein the random access procedure includes a four-step random access procedure and the random access message includes a message 4 associated with the four-step random access procedure.

19. The method of claim 15, further comprising:
transmitting the random access message including the indication of the physical uplink control channel repetition parameter on a physical downlink control channel.

20. The method of claim 19, wherein the random access procedure includes a two-step random access procedure and the random access message includes a message B associated with the two-step random access procedure.

21. The method of claim 19, wherein the random access procedure includes a four-step random access procedure and the random access message includes a message 4 associated with the four-step random access procedure.

22. The method of claim 19, further comprising:
transmitting downlink control information on the physical downlink control channel during the random access procedure, the downlink control information including a downlink control information bitfield indicating the physical uplink control channel repetition parameter.

23. The method of claim 15, further comprising:
transmitting, to the UE, a system information block including system information indicating a physical uplink control channel repetition configuration including a set of physical uplink control channel repetition parameters including the physical uplink control channel repetition parameter, wherein the system information includes remaining minimum system information.

24. The method of claim 15, wherein the physical uplink control channel repetition parameter corresponds to a physical uplink control channel format, a frequency range, a subcarrier spacing, or a combination thereof.

25. The method of claim 15, wherein:
the random access procedure includes a two-step random access procedure or a four-step random access procedure; and
the feedback information includes a hybrid automatic repeat request acknowledgment.

26. An apparatus for wireless communication at a user equipment (UE), comprising:
a processor;
memory coupled with the processor; and
instructions stored in the memory and executable by the processor to cause the apparatus to:
receive, from a network entity, a random access message of a random access procedure, the random access message including an indication of a physical uplink control channel repetition parameter;
determine the physical uplink control channel repetition parameter based at least in part on the received random access message including the indication; and
transmit, to the network entity, feedback information associated with the received random access message on a physical uplink control channel based at least in part on the determined physical uplink control channel repetition parameter.

27. An apparatus for wireless communication at a network entity, comprising:
a processor;
memory coupled with the processor; and
instructions stored in the memory and executable by the processor to cause the apparatus to:
transmit, to a user equipment (UE), a random access message of a random access procedure, the random access message including an indication of a physical uplink control channel repetition parameter; and
receive, from the UE, feedback information associated with the random access message via a physical uplink control channel based at least in part on the physical uplink control channel repetition parameter.

* * * * *